(12) United States Patent
Shin et al.

(10) Patent No.: US 12,474,570 B2
(45) Date of Patent: Nov. 18, 2025

(54) PROJECTION OPTICAL SYSTEM COMPRISING A PAIR OF ACTUATORS EACH HAVING AN ELECTROACTIVE POLYMER FILM AND SEE-THROUGH DISPLAY DEVICE INCLUDING THE SAME

(71) Applicants: SAMSUNG ELECTRONICS CO., LTD., Suwon-si (KR); AJOU UNIVERSITY INDUSTRY-ACADEMIC COOPERATION FOUNDATION, Suwon-si (KR)

(72) Inventors: Bongsu Shin, Seoul (KR); Jesung Koh, Suwon-si (KR); Changhwan Kim, Suwon-si (KR); Doohoe Lee, Seongnam-si (KR); Hongseok Lee, Seoul (KR)

(73) Assignees: SAMSUNG ELECTRONICS CO., LTD., Suwon-si (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 809 days.

(21) Appl. No.: 17/752,372

(22) Filed: May 24, 2022

(65) Prior Publication Data
US 2023/0062633 A1    Mar. 2, 2023

(30) Foreign Application Priority Data
Aug. 30, 2021    (KR) .................. 10-2021-0115028

(51) Int. Cl.
*G02B 26/08* (2006.01)
*G02B 27/01* (2006.01)

(52) U.S. Cl.
CPC ..... *G02B 26/0833* (2013.01); *G02B 27/0172* (2013.01); *G02B 2027/0178* (2013.01)

(58) Field of Classification Search
CPC .................................................. H10N 30/886
See application file for complete search history.

(56) References Cited

U.S. PATENT DOCUMENTS

| 6,331,909 B1 | 12/2001 | Dunfield |
| 6,812,624 B1 | 11/2004 | Pei et al. |
| 8,467,133 B2 | 6/2013 | Miller |

(Continued)

FOREIGN PATENT DOCUMENTS

| CN | 101196601 A | * | 6/2008 | ........... G02B 13/001 |
| CN | 101925836 A | * | 12/2010 | .......... F04B 43/0054 |

OTHER PUBLICATIONS

Communication dated Feb. 9, 2024, issued by the European Patent Office in European Application No. 22188693.0.

(Continued)

*Primary Examiner* — Paul C Lee
(74) *Attorney, Agent, or Firm* — Sughrue Mion, PLLC

(57) ABSTRACT

A projection optical system includes a base, a mirror on the base, and a pair of first actuators provided between the base and the mirror, and facing each other. Each of the pair of first actuators includes a first electroactive polymer film having a size that varies according to an applied voltage, and a slope of the mirror is adjusted according to a change in the size of the first electroactive polymer film.

14 Claims, 17 Drawing Sheets

(56) References Cited

U.S. PATENT DOCUMENTS

| | | |
|---|---|---|
| 2002/0014579 A1* | 2/2002 | Dunfield ............ G02B 26/0833 |
| | | 250/216 |
| 2006/0113878 A1* | 6/2006 | Pei ........................ H10N 30/87 |
| | | 310/363 |
| 2007/0200453 A1 | 8/2007 | Heim |
| 2007/0200468 A1 | 8/2007 | Heim |
| 2009/0236939 A1 | 9/2009 | Heim |
| 2010/0231091 A1 | 9/2010 | Heim |
| 2016/0286177 A1 | 9/2016 | Border et al. |
| 2017/0357088 A1 | 12/2017 | Matsuzaki et al. |
| 2019/0025571 A1* | 1/2019 | Lee ................... G02F 1/133524 |
| 2019/0206134 A1 | 7/2019 | Devam et al. |
| 2019/0257984 A1 | 8/2019 | She et al. |
| 2020/0125227 A1* | 4/2020 | Shin ................... G02B 27/0176 |

OTHER PUBLICATIONS

Communication issued Jan. 27, 2023 by the European Patent Office in counterpart European Patent Application No. 22188693.0.
Casset, F. et al., "Resonant Asymmetric Micro-Mirror Using Electro Active Polymer Actuators", 2018 IEEE Sensors, IEEE, (Oct. 28, 2018), pp. 1-4, XP033509529.

* cited by examiner

PROJECTION OPTICAL SYSTEM COMPRISING A PAIR OF ACTUATORS EACH HAVING AN ELECTROACTIVE POLYMER FILM AND SEE-THROUGH DISPLAY DEVICE INCLUDING THE SAME

CROSS-REFERENCE TO RELATED APPLICATION

This application is based on and claims priority under 35 U.S.C. § 119 to Korean Patent Application No. 10-2021-0115028, filed on Aug. 30, 2021, in the Korean Intellectual Property Office, the disclosure of which is incorporated by reference herein in its entirety.

BACKGROUND

1. Field

The disclosure relates to display devices including a projection optical system and a see-through display device.

2. Description of the Related Art

Recently, as electronic devices and display devices capable of realizing virtual reality (VR) have been developed, interest in VR has increased. As a next step of VR, technologies (methods) that may realize augmented reality (AR) and mixed reality (MR) have also been studied.

Unlike VR that presents a complete virtual world, AR is a display technique that further increases an effect of reality by overlapping (combining) virtual objects or information on an environment of the real world. Considering that VR is limitedly applicable to fields such as games or virtual experiences, AR may be applicable to various real environments. In particular, AR is drawing the attention as a next generation display technique suitable for a ubiquitous environment or an Internet-of-Things (IoT) environment. AR may be an example of MR in that AR mixes the real world and additional information such as virtual world information.

In the case where a see-through display device includes a holographic optical element as a combiner, the see-through display device may have a narrow eye box. Static methods for solving the narrow eye box issue include a method of generating multiple spots by additionally using high-order diffraction other than ±1-order diffraction or adjusting a reference beam when exposing a holographic optical element. Dynamic methods for solving the narrow eye box issue include a method of adjusting an optical path of an image entering a pupil of a user by arranging a projection optical system (e.g., a microelectromechanical systems (MEMS) mirror) on the optical path between a display unit and a combiner.

The size and the driving speed of a MEMS mirror have a trade-off relationship. As the size of the MEMS mirror increases, the driving speed of the MEMS mirror decreases, and thus, the size of the MEMS mirror needs to be decreased to increase the driving speed of the MEMS mirror. Therefore, it may be difficult to increase the size or area of a MEMS mirror to reach a required level.

SUMMARY

An object of the disclosure is to provide a projection optical system having a large area and a high driving speed.

Another object of the disclosure is to provide a see-through display device including a projection optical system having a large area and a high driving speed.

However, the objects of the disclosure are not limited thereto.

Additional aspects will be set forth in part in the description which follows and, in part, will be apparent from the description, or may be learned by practice of the presented embodiments of the disclosure.

According to an aspect of the disclosure, there is provided a projection optical system including: a base; a mirror; and a pair of first actuators provided between the base and the mirror, the pair of first actuators configured to face each other in a first direction, wherein each of the pair of first actuators comprises a first electroactive polymer film having structural flexibility such that a size of the first electroactive polymer film is changeable based on an applied voltage, and wherein the mirror is adjustable based on a change in the size of the first electroactive polymer film.

The first electroactive polymer film may have a first surface and a second surface, and each of the pair of first actuators may further include: a first electrode provided on the first surface; a second electrode provided on the second surface; a first stretch maintaining film provided to surround the first electrode; and a pair of first hinge elements provided on the first stretch maintaining film.

The first stretch maintaining film may include a hole, and the first electrode is provided in the hole.

The pair of first hinge elements may be spaced apart from each other, and wherein the first electrode is provided between the pair of first hinge elements in a second direction from the base toward the mirror.

The second surfaces of the pair of first actuators may face each other.

In a region adjacent to the mirror, the first electroactive polymer film may have a first width that decreases toward the mirror.

The projection optical system may further include a pair of second actuators which are between the pair of first actuators and face each other in a third direction intersecting with the first direction, wherein each of the pair of second actuators includes: a second electroactive polymer film having a third surface and a fourth surface; a third electrode provided on the third surface; a fourth electrode provided on the fourth surface; a second stretch maintaining film provided to surround the third electrode; and a pair of second hinge elements provided on the second stretch maintaining film.

Each of the pair of first actuators further may include a serpentine spring, and the first electroactive polymer film is provided on the serpentine spring to deform the serpentine spring.

The serpentine spring may include a hole, and the first electroactive polymer film covers the hole.

The first electroactive polymer film may have a first surface and a second surface, and each of the pair of first actuators includes: a first electrode provided on the first surface; a second electrode provided on the second surface; a first frame provided on the first surface and surrounding the first electrode; and a second frame provided on the second surface and surrounding the second electrode.

Each of the first frame and the second frame may have a rhombic shape in which a first corner and a second corner, which are opposite to each other in a direction from the base toward the mirror, are in contact with the base and the mirror, respectively.

Each of the pair of first actuators may further include a lift element provided at a side opposite to the mirror with respect to the base, and wherein the lift element is configured to push or pull the base.

The lift element may include: a lift base facing the base; a restoring element configured to apply a force to the base and the lift base to increase a distance between the base and the lift base; and a deformation element provided between the lift base and the base, wherein a length of the deformation element varies according to a temperature of the deformation element, and a distance between the base and the lift base is adjusted by the restoring element and the deformation element.

The projection optical system may further include a support film between the base, the mirror, and the pair of first actuators, wherein the support film extends along surfaces of the base, the mirror, and the pair of first actuators.

The projection optical system may further include a pivot pillar between the base and the mirror, wherein one end of the pivot pillar is in contact with the base, and another end of the pivot pillar is in contact with the mirror.

According to another aspect of the disclosure, there is provided a see-through display device including: an image generator configured to generate virtual image light comprising virtual image information; a combiner configured to concentrate the virtual image light to a first spot; and a projection optical system configured to project, to the combiner, the virtual image light provided from the image generator, wherein the projection optical system includes: a base, a mirror, and a pair of actuators provided between the base and the mirror, the pair of actuators configured to face each other in a first direction, wherein each of the pair of actuators comprises an electroactive polymer film having structural flexibility such that a size of the electroactive polymer film is changeable based on an applied voltage, and wherein the mirror is adjustable based on a change in the size of the electroactive polymer film.

The electroactive polymer film may have a first surface and a second surface, and each of the pair of actuators further includes: a first electrode provided on the first surface, a second electrode provided on the second surface, a stretch maintaining film provided to surround the first electrode, and a pair of hinge elements provided on the stretch maintaining film.

The combiner may be further configured to concentrate the image light further to a second spot which is different from the first spot based on the change in the size of the electroactive polymer film.

The see-through display device may further include an eye tracker configured to measure a pupil position of a user.

According to another aspect of the disclosure, there is provide a see-through display device including: a lens frame having a pair of holes; a pair of temples connected to both ends of the lens frame, respectively; a pair of combiners inserted into the pair of holes, respectively; and electronic system provided in the pair of temples, wherein the electronic system comprises an image generator configured to generate virtual image light comprising virtual image information, and a projection optical system configured to project, to the combiner, the virtual image light provided from the image generator, and wherein the projection optical system comprises: a base, a mirror, and a pair of actuators provided between the base and the mirror, the pair of actuators configured to face each other in a first direction, wherein each of the pair of actuators comprises an electroactive polymer film having structural flexibility such that a size of the electroactive polymer film is changeable based on an applied voltage, and |wherein the mirror is adjustable based on a change in the size of the electroactive polymer film.

According to another aspect of the disclosure, there is provide a projection optical system including: a base portion; a mirror; and at least one actuator provided between the base portion at the mirror, the at least one actuator comprising an electroactive polymer film having a malleable structure, which is changeable based on an applied voltage, wherein the mirror is adjustable based on a change in the structure of electroactive polymer film.

A position or a direction of the mirror may be adjustable based on a change in the structure of electroactive polymer film.

According to another aspect of the disclosure, there is provide a display device including: a controller configured to apply a voltage; and a projection optical system including: a base portion; a mirror; and at least one actuator provided between the base portion at the mirror, the at least one actuator comprising an electroactive polymer film having a malleable structure, which is changeable based on the applied voltage, wherein the mirror is adjustable based on a change in the structure of first electroactive polymer film.

Based on a first voltage applied to the electroactive polymer film, the mirror may be adjusted to face a first direction, and based on a second voltage applied to the electroactive polymer film, the mirror may be adjusted to face a second direction.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
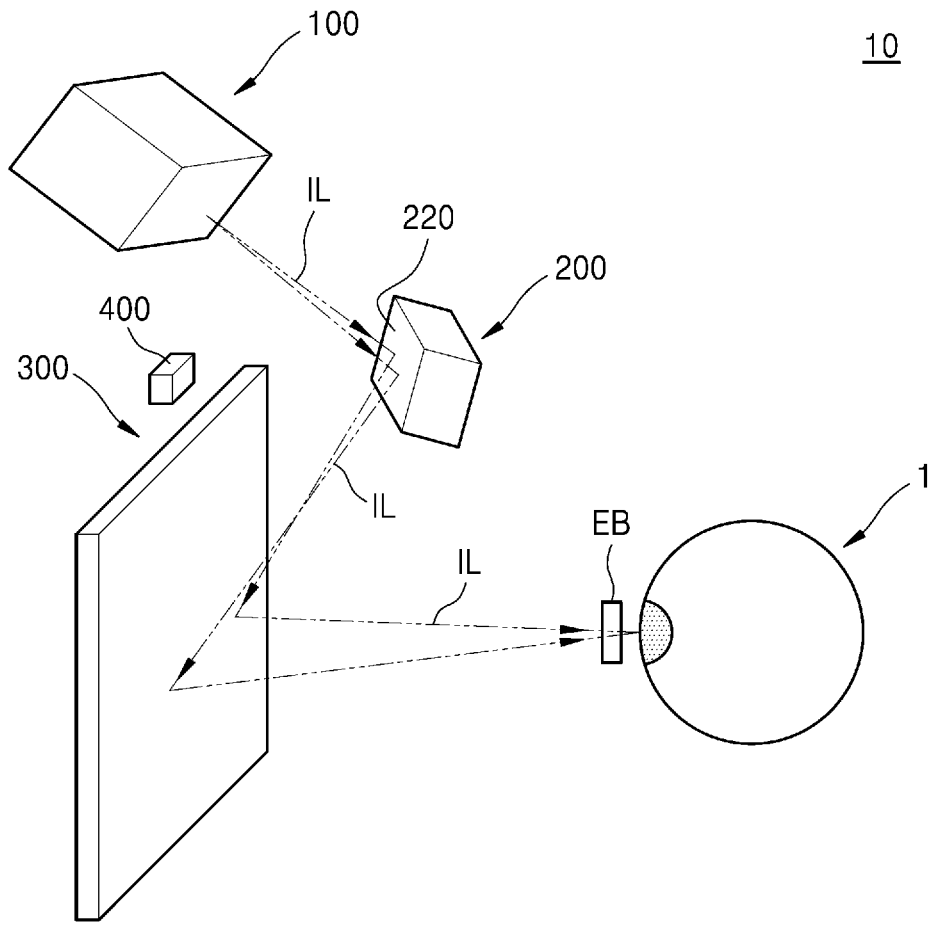
FIG. 1 is a conceptual diagram of a see-through display device, according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the disclosure will be described in detail with reference to the accompanying drawings. In the following drawings, like reference numerals refer to like elements, and sizes of elements in the drawings may be exaggerated for clarity and convenience of description. Meanwhile, embodiments described below are merely illustrative, and various modifications may be made from these embodiments.

Hereinafter, an expression "on" used herein may include not only "immediately on in a contact manner" (e.g., "direct contact") but also "on in a non-contact manner".

The singular expression also includes the plural meaning as long as it is not inconsistent with the context. In addition, when an element is referred to as "including" a constituent element, other constituent elements may be further included not excluded unless there is any other particular mention on it.

Figure 2:
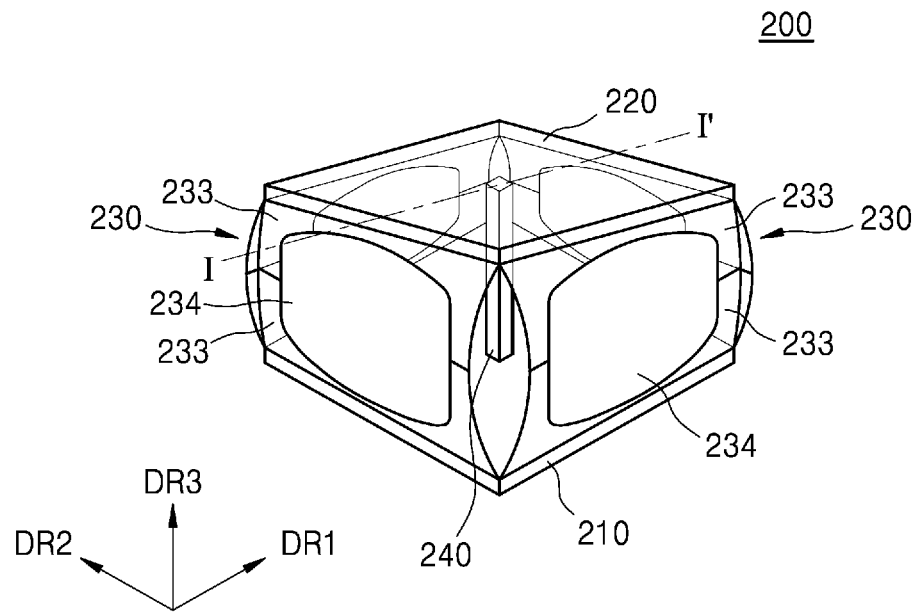
FIG. 2 is a perspective view of a projection optical system of FIG. 1.
Figure 3:
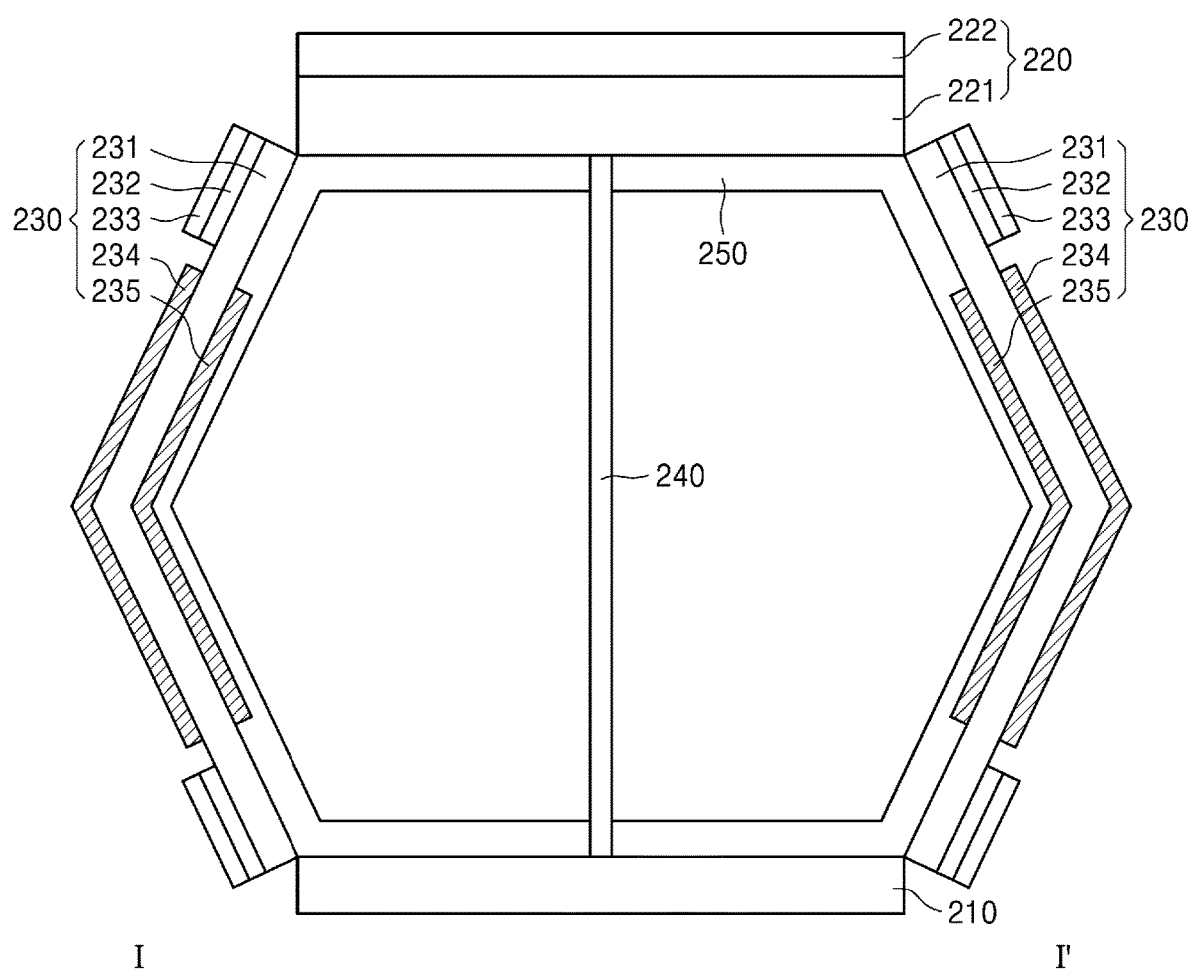
FIG. 3 is a cross-sectional view taken along line I-I' of the projection optical system of FIG. 2.
Figure 4:
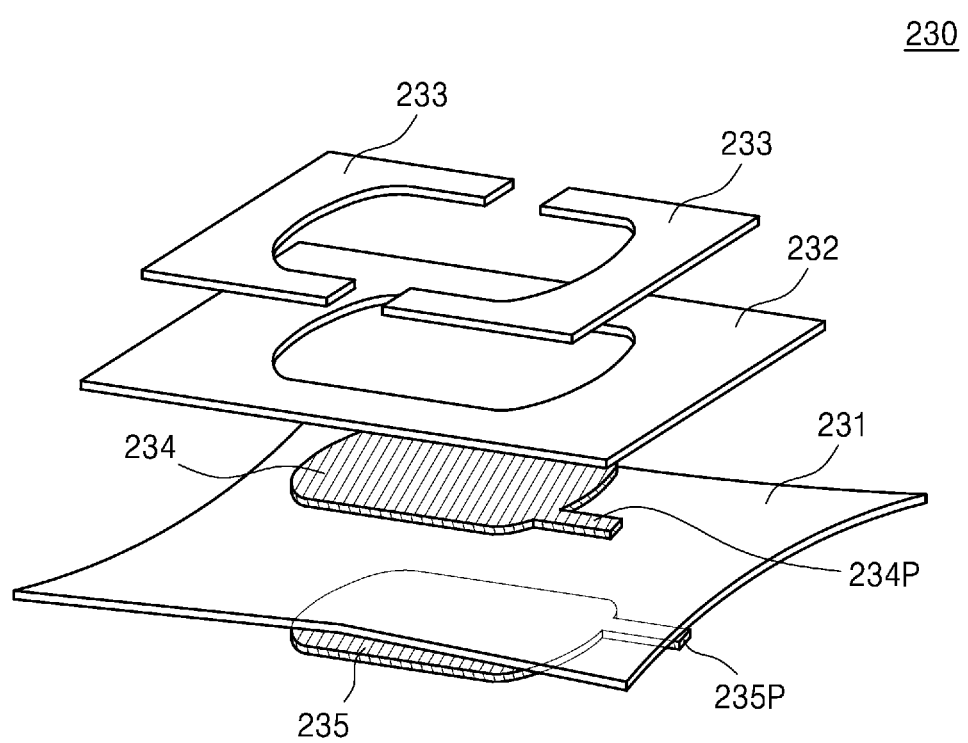
FIG. 4 is an exploded perspective view of an actuator of the projection optical system of FIG. 2.

FIG. 1 is a conceptual diagram of a see-through display device 10, according to an example embodiment. FIG. 2 is a perspective view of a projection optical system 200 of FIG. 1. FIG. 3 is a cross-sectional view taken along line I-I' of the projection optical system 200 of FIG. 2. FIG. 4 is an exploded perspective view of an actuator 230 (hereinafter, also referred to as the left actuator 230 and the right actuator 230) of the projection optical system 200 of FIG. 2.

Referring to FIG. 1, according to an example embodiment, the see-through display device 10 may include an image generator 100, the projection optical system 200, a combiner 300, and an eye tracker 400. The see-through display device 10 may be a device that combines real image light with virtual image light and provides the combined light to a user. The real image light may be light that is emitted from a real object and includes image information about the real object. The virtual image light may be, for example, light that is emitted from a display device such as a spatial light modulator (SLM), and includes required virtual image information.

The image generator 100 may emit virtual image light. For example, the image generator 100 may include a light source, a liquid crystal on silicon (LCoS), and a polarization beam splitter. However, the disclosure is not limited thereto. As such, according to another example embodiment, image generator 100 may be an electronic device including components capable of outputting a virtual image.

The projection optical system 200 may be on an optical path between the image generator 100 and the combiner 300. The projection optical system 200 may include a mirror layer 220. The projection optical system 200 may reflect the virtual image light emitted from the image generator 100 and project the reflected virtual image light to the combiner 300. The projection optical system 200 may adjust the slope and/or position of the mirror layer 220 to change the position to which virtual image light is concentrated. The projection optical system 200 will be described below.

The combiner 300 may combine real image light with virtual image light and provide the combined light to a user 1. The combiner 300 may include a photosensitive film on which an interference pattern is formed. The virtual image light may be reflected by the combiner 300. The virtual image light IL, when reflected, may be diffracted and concentrated by the interference pattern. For example, the virtual image light IL may be concentrated to a pupil of the user 1. The real image light may pass through the combiner 300 and then reach the user 1.

The eye tracker 400 may measure a pupil position of the user 1 to generate information about a user pupil position. The slope and/or position of a mirror of the projection optical system 200 may be adjusted based on the information about the user pupil position generated by the eye tracker 400.

The pupil of the user 1 may receive the virtual image light IL within a certain range. In other words, the user 1 may view the virtual image light IL within the certain range. A region through which the user 1 may view a virtual image may be referred to as an eye box EB.

Referring to FIGS. 2 to 4, according to an example embodiment, the projection optical system 200 may include a base 210, the mirror layer 220, a plurality of actuators 230, a support film 250, and a pivot pillar 240. The base 210 may have a flat plate shape extending in a first direction DR1 and a second direction DR2. For example, the base 210 may have a quadrangular flat plate shape. For example, the base 210 may include polyethylene terephthalate (PET) or FR4 glass epoxy laminate. The base 210 may be sufficiently thick to be rigid.

The mirror layer 220 may be spaced apart from the base 210. The mirror layer 220 may face the base 210. According to an example embodiment, the mirror layer 220 may be provided in a direction perpendicular to the flat plate surface of the base 210. For instance, the mirror layer 220 may be above the base 210. The mirror layer 220 may have a flat plate shape. For example, the mirror layer 220 may have a quadrangular flat plate shape. When the plurality of actuators 230 are not driven, the mirror layer 220 may be parallel to the base 210. The mirror layer 220 may include a mirror base 221 and a mirror 222 on the mirror base 221. For example, the mirror base 221 may include PET or FR4 glass epoxy laminate. The mirror base 221 may be sufficiently thick to be rigid.

The plurality of actuators 230 may be between the base 210 and the mirror layer 220. Four actuators 230 are illustrated, but this is an example. The number of actuators 230 may be determined as necessary. Among the plurality of actuators 230, a pair of actuators 230 may face each other in the first direction DR1, and the other pair of actuators 230 may face each other in the second direction DR2. The four actuators 230 may be substantially the same as each other. For brevity of description, one actuator 230 is described.

The actuator 230 may include an electroactive polymer film 231, a stretch maintaining film 232, a pair of hinge elements 233, a first electrode 234, and a second electrode 235. The electroactive polymer film 231 may have a size or area that varies according to an electric field applied to the electroactive polymer film 231. In detail, when a voltage is applied to both surfaces of the electroactive polymer film 231 (e.g., a voltage difference is generated) and thus an electric field is generated in the electroactive polymer film 231, the thickness of the electroactive polymer film 231 is decreased, and accordingly, the size or area of the electroactive polymer film 231 may be increased. As the voltage difference applied to the electroactive polymer film 231 increases, the area or size of the electroactive polymer film 231 may be increased. The electroactive polymer film 231 may include an electronic electroactive polymer. For example, the electroactive polymer film 231 may include a dielectric elastomer. For example, the electroactive polymer film 231 may include a silicone elastomer. The electroactive polymer film 231 may have elasticity. When the electroactive polymer film 231 is stretched, the electroactive polymer film 231 may have a restoring force to return to a state before being stretched. The electroactive polymer film 231 may include a first surface and a second surface which face opposite directions. The first surface may face the outside of the projection optical system 200, and the second surface may face the inside of the projection optical system 200.

The stretch maintaining film 232 may be on the first surface of the electroactive polymer film 231. For example, the stretch maintaining film 232 may be adhered to the first surface of the electroactive polymer film 231. Before the stretch maintaining film 232 is adhered to the electroactive polymer film 231, the electroactive polymer film 231 may be pre-stretched. When the stretch maintaining film 232 is adhered to the pre-stretched electroactive polymer film 231, the stretch maintaining film 232 may hinder the restoration of the electroactive polymer film 231, thereby maintaining the pre-stretched state of the electroactive polymer film 231. For example, the stretch maintaining film 232 may include a PET film. The stretch maintaining film 232 may have a sufficiently low thickness to have flexibility. For example, the thickness of the stretch maintaining film 232 may be about 50 µm to about 200 µm. The stretch maintaining film 232 may have a hole exposing the first surface of the electroactive polymer film 231.

The first electrode 234 may be on the first surface of the electroactive polymer film 231. The first electrode 234 may be in the hole of the stretch maintaining film 232. The second electrode 235 may be on the second surface of the electroactive polymer film 231. The first electrode 234 and the second electrode 235 may face each other with the electroactive polymer film 231 therebetween. The first electrode 234 and the second electrode 235 may apply a voltage to the electroactive polymer film 231. The first electrode 234 and the second electrode 235 may be stretchable electrodes. Voltages applied to the plurality of actuators 230 may be adjusted independently of each other.

A first conductive line 234P may be at one side of the first electrode 234. The first conductive line 234P may protrude from the first electrode 234. The first conductive line 234P may pass between the electroactive polymer film 231 and the stretch maintaining film 232. The first conductive line 234P may be between the first electrode 234 and a controller, which applies a voltage to the first electrode 234, to electrically connect the first electrode 234 to the controller. The voltage applied to the first electrode 234 may be adjusted by the controller. The first conductive line 234P may include a stretchable electrode material. In an example, the first conductive line 234P may include substantially the same material as that of the first electrode 234.

A second conductive line 235P may be at one side of the second electrode 235. The second conductive line 235P may protrude from the second electrode 235. The second conductive line 235P may pass between the electroactive polymer film 231 and the support film 250. The second conductive line 235P may be between the second electrode 235 and the controller, which applies a voltage to the second electrode 235, to electrically connect the second electrode 235 to the controller. The voltage applied to the second electrode 234 may be adjusted by the controller. The second conductive line 235P may include a stretchable electrode material. In an example, the second conductive line 235P may include substantially the same material as that of the second electrode 235.

The pair of hinge elements 233 may be on the stretch maintaining film 232. The pair of hinge elements 233 may be spaced apart from each other with the first electrode 234 therebetween. The pair of hinge elements 233 may be arranged in a third direction DR3 which is toward the mirror layer 220 from the base 210. One of the pair of hinge elements 233 may be adjacent to the base 210, and the other may be adjacent to the mirror layer 220. The pair of hinge elements 233 may be configured to fold or unfold the electroactive polymer film 231 when the electroactive polymer film 231 is stretched or contracted. When the pair of hinge elements 233 fold the electroactive polymer film 231, the pair of hinge elements 233 may become closer to each other. When the pair of hinge elements 233 unfold the electroactive polymer film 231, the pair of hinge elements 233 may be moved apart from each other. As the voltage difference generated in the electroactive polymer film 231 increases, the size or area of the electroactive polymer film 231 may be increased, and accordingly, the pair of hinge elements 233 may unfold the electroactive polymer film 231 to a large degree. As the voltage difference generated in the electroactive polymer film 231 decreases, the size or area of the electroactive polymer film 231 may be decreased, and the pair of hinge elements 233 may fold the electroactive polymer film 231 to a large degree. The size or area of the electroactive polymer film 231 may be lowest when no voltage difference is generated in the electroactive polymer film 231. When the size or area of the electroactive polymer film 231 is lowest, the pair of hinge elements 233 may fold the electroactive polymer film 231 to the greatest degree. A degree of unfolding or folding the electroactive polymer film 231 by the pair of hinge elements 233 may be adjusted by adjusting a magnitude of the voltage applied to the electroactive polymer film 231 by the first electrode 234 and the second electrode 235. For example, the pair of hinge elements 233 may include PET. The pair of hinge elements 233 may be sufficiently thick to be rigid. For example, the thickness of the pair of hinge elements 233 may be about 200 μm to about 300 μm.

The support film 250 may be in an internal region of the projection optical system 200 defined by the base 210, the mirror layer 220, and the plurality of actuators 230. The support film 250 may cover surfaces of the base 210, the mirror layer 220, and the plurality of actuators 230, which face the inner region of the projection optical system 200. For example, the support film 250 may extend along the surfaces of the base 210, the mirror base 221, the electroactive polymer films 231, and the second electrodes 235, which face the inner region of the projection optical system 200. For example, a surface of the support film 250 may be in contact with the surfaces of the base 210, the mirror base 221, the electroactive polymer films 231, and the second electrodes 235. The second electrodes 235 may be between the support film 250 and the electroactive polymer films 231. For example, the support film 250 may include polyimide. The support film 250 may have a sufficiently low thickness to have flexibility. For example, the thickness of the support film 250 may be 50 μm or less.

The pivot pillar 240 may be between the base 210 and the mirror layer 220. The pivot pillar 240 may penetrate the support film 250. The pivot pillar 240 may extend from the base 210 to the mirror layer 220. A first end of the pivot pillar 240 may be in contact with the base 210, and a second of the pivot pillar 240 may be in contact with the mirror base 221. The first end and the second end of the pivot pillar 240 may be spaced apart from each other in the direction in which the pivot pillar 240 extends. The pivot pillar 240 may be fixed to a central portion of the mirror layer 220. The central portion of the mirror layer 220 in contact with the pivot pillar 240 may be a reference by which the slope of the mirror layer 220 is adjusted. Adjustment of the slope of the mirror layer 220 will be described below.

Figure 5:
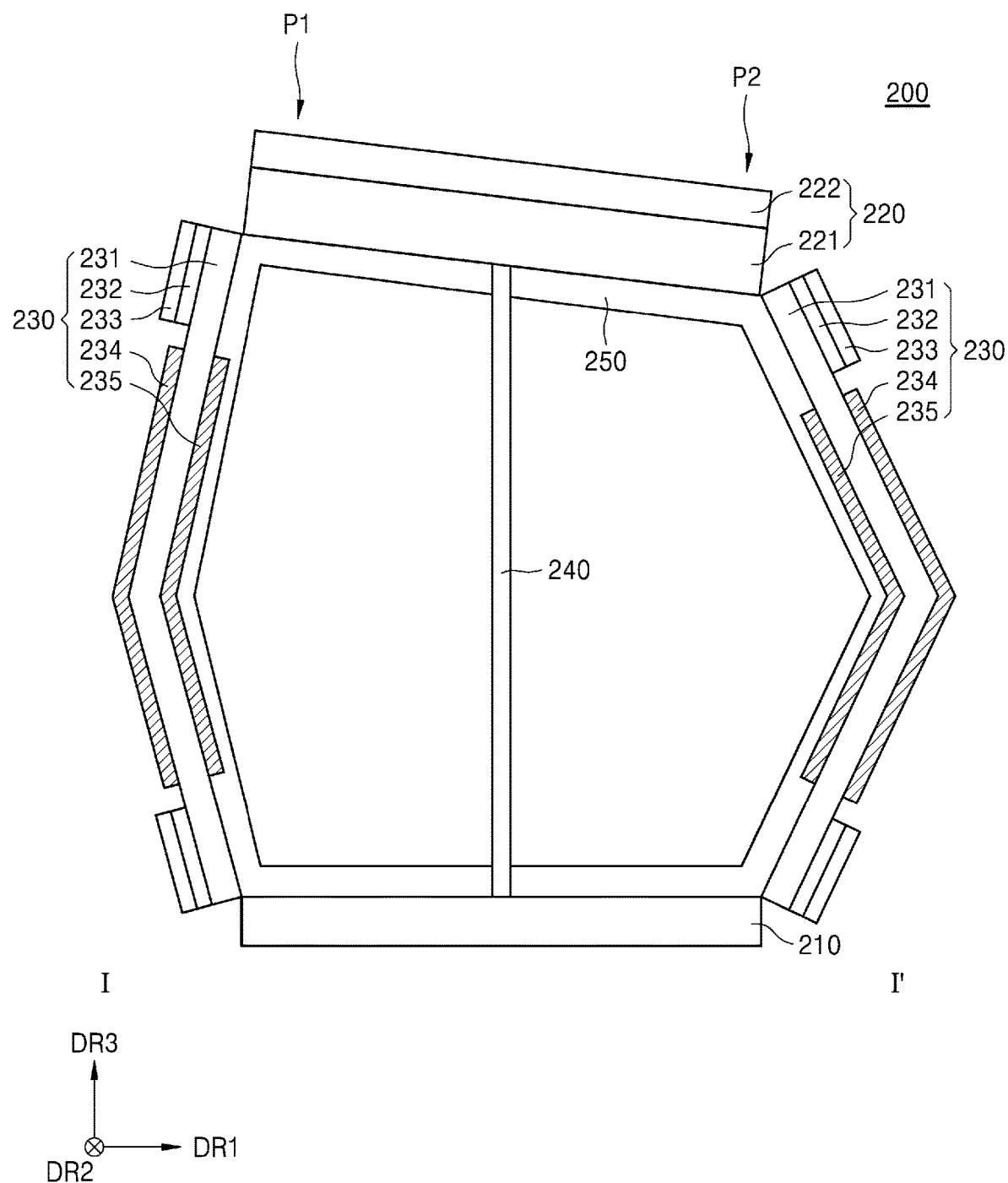
FIG. 5 is a cross-sectional view corresponding to line I-I' of the projection optical system of FIG. 2 for describing an operation of the projection optical system.
Figure 6:
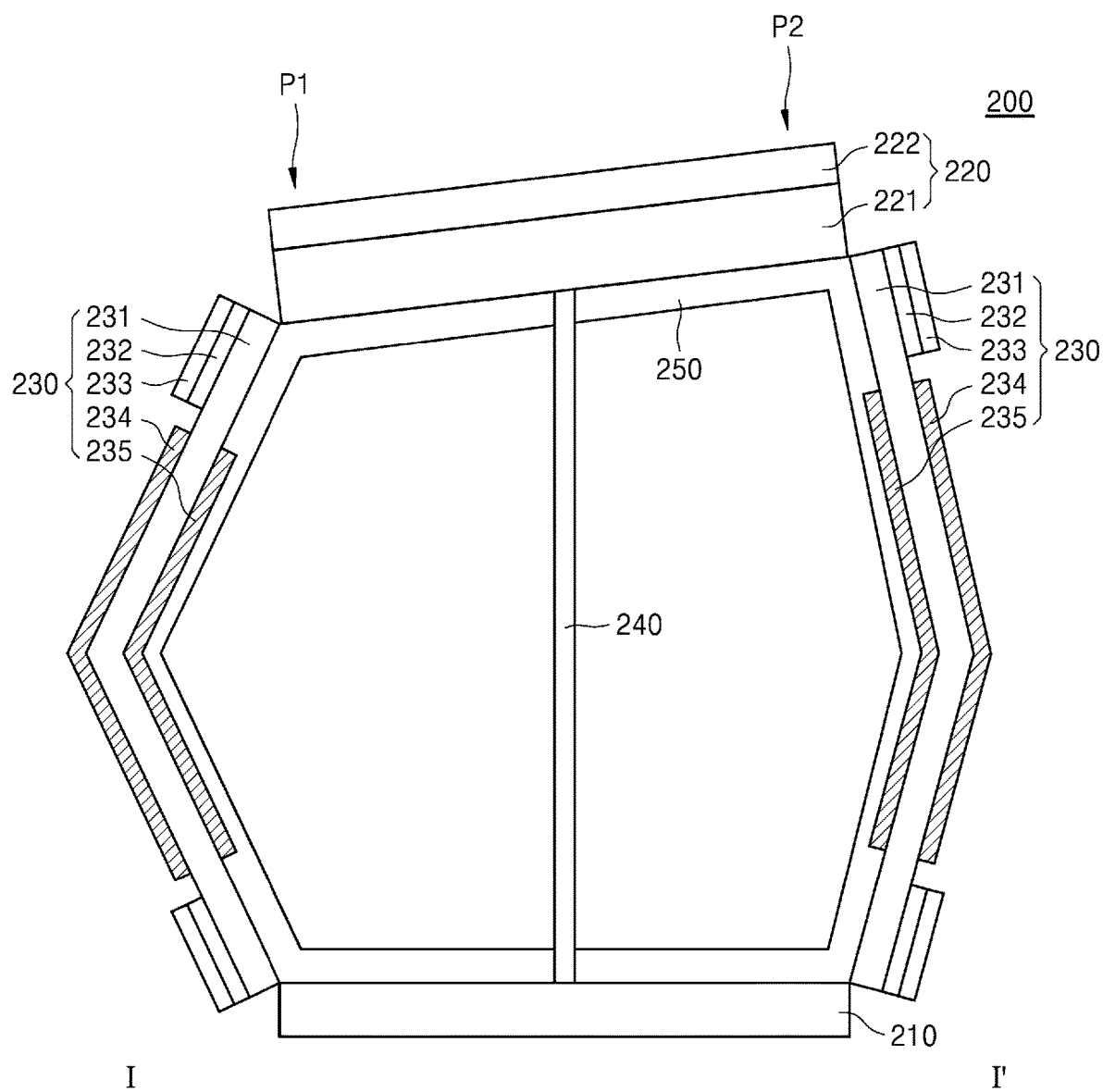
FIG. 6 is a cross-sectional view corresponding to line I-I' of the projection optical system of FIG. 2 for describing an operation of the projection optical system.

FIG. 5 is a cross-sectional view corresponding to line I-I' of the projection optical system 200 of FIG. 2 for describing an operation of the projection optical system 200. FIG. 6 is a cross-sectional view corresponding to line I-I' of the projection optical system 200 of FIG. 2 for describing an operation of the projection optical system 200.

Referring to FIG. 5, a voltage may be applied to the first electrode 234 and the second electrode 235 of a first one (hereinafter, referred to as a left actuator) of the pair of actuators 230 facing each other in the first direction DR1, and thus, a voltage difference may be generated in the electroactive polymer film 231 of the left actuator 230. No voltage may be applied to the first electrode 234 and the second electrode 235 of a second (or the other) one (hereinafter, referred to as a right actuator) of the pair of actuators 230 facing each other in the first direction DR1. The terms 'left actuator' and 'right actuator' are only used to indicate different actuators, and do not refer to an actuator actually on the left side and an actuator on the right side. The size or area of the electroactive polymer film 231 of the left actuator 230 may be increased. Accordingly, the pair of hinge elements 233 may unfold the electroactive polymer film 231. Accordingly, the length of the left actuator 230 in the third direction DR3 may become greater than the length of the right actuator 230 in the third direction DR3.

The support film 250 in contact with the left actuator 230 may be moved in response to the unfolding of the left actuator 230. Force by which the left actuator 230 is unfolded (e.g., the force by which the pair of hinge elements 233 unfold the electroactive polymer film 231 as the size or area of the electroactive polymer film 231 increases) may be transferred to the mirror layer 220 and the base 210 through the support film 250. The support film 250 in contact with the left actuator 230 may increase the distance between the mirror layer 220 and the base 210.

The mirror layer 220 may be inclined with respect to a portion at which the pivot pillar 240 is in contact with the mirror base 221. A first portion (P1) of the mirror layer 220, which is adjacent to the left actuator 230, may be moved away from the base 210, and a second portion (P2) of the mirror layer 220, which is adjacent to the right actuator 230, may be moved toward the base 210. Because the electroactive polymer film 231 of the right actuator 230 has a restoring force to return to the size or area before being pre-stretched, the right actuator 230 may be folded as the second portion of the mirror layer 220 is moved toward the base 210.

Referring to FIG. 6, unlike as illustrated in FIG. 5, a voltage may be applied to the first electrode 234 and the second electrode 235 of the right actuator 230, and thus, a voltage difference may be generated in the electroactive polymer film 231 of the right actuator 230. No voltage may be applied to the first electrode 234 and the second electrode 235 of the left actuator 230. The pair of hinge elements 233 of the right actuator 230 may unfold the electroactive polymer film 231. Accordingly, the length of the right actuator 230 in the third direction DR3 may become greater than the length of the left actuator 230 in the third direction DR3.

The support film 250 in contact with the right actuator 230 may be moved in response to the unfolding of the left actuator 230. Force by which the right actuator 230 is unfolded may be transferred to the mirror layer 220 and the base 210 through the support film 250. The support film 250 in contact with the right actuator 230 may increase the distance between the mirror layer 220 and the base 210.

The mirror layer 220 may be inclined with respect to a portion P1 at which the pivot pillar 240 is in contact with the mirror base 221. The second portion P2 of the mirror layer 220, which is adjacent to the right actuator 230, may be moved away from the base 210, and the second portion of the mirror layer 220, which is adjacent to the left actuator 230, may be moved toward the base 210. Because the electroactive polymer film 231 of the left actuator 230 has a restoring force to return to the size or area before being pre-stretched, the left actuator 230 may be folded as the first portion of the mirror layer 220 is moved toward the base 210.

FIG. 3 illustrates a state in which no voltage is applied to the first electrode 234 and the second electrode 235 of the pair of actuators 230 facing each other in the first direction DR1. Unlike the mirror layer 220 of FIG. 3, which is substantially parallel to the base 210, the mirror layer 220 of FIG. 5 and the mirror layer 220 of FIG. 6 may be inclined with respect to the base 210. The pair of actuators 230 facing each other in the second direction DR2 may also be driven in the same manner as the pair of actuators 230 facing each other in the first direction DR1 to adjust the slope of the mirror layer 220.

The disclosure may provide the projection optical system 200 capable of adjusting the direction of projection of the virtual image light IL by using the pair of actuators 230 facing each other in the first direction DR1 and the pair of actuators 230 facing each other in the second direction DR2. A process of adjusting the direction of projection of the virtual image light IL will be described below.

Figure 7:
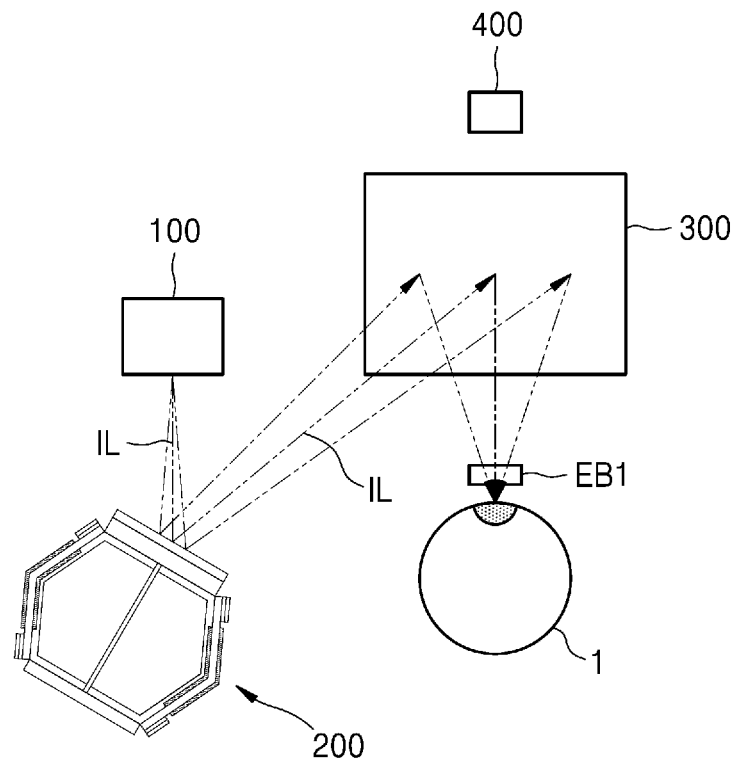
FIG. 7 is a conceptual diagram of a see-through display device for describing a process of adjusting the direction of projection of virtual image light.
Figure 8:
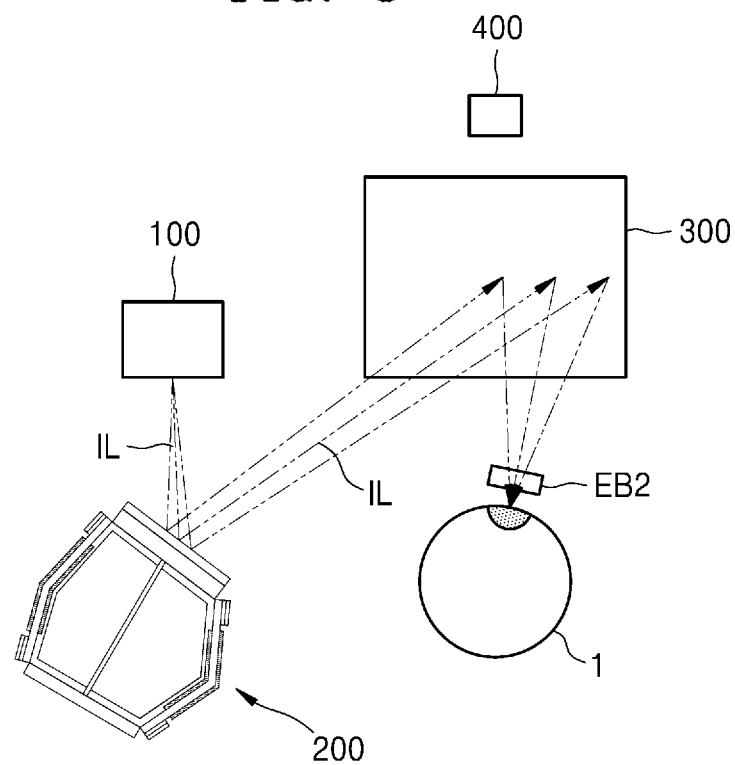
FIG. 8 is a conceptual diagram of a see-through display device for describing a process of adjusting the direction of projection of virtual image light.
Figure 9:
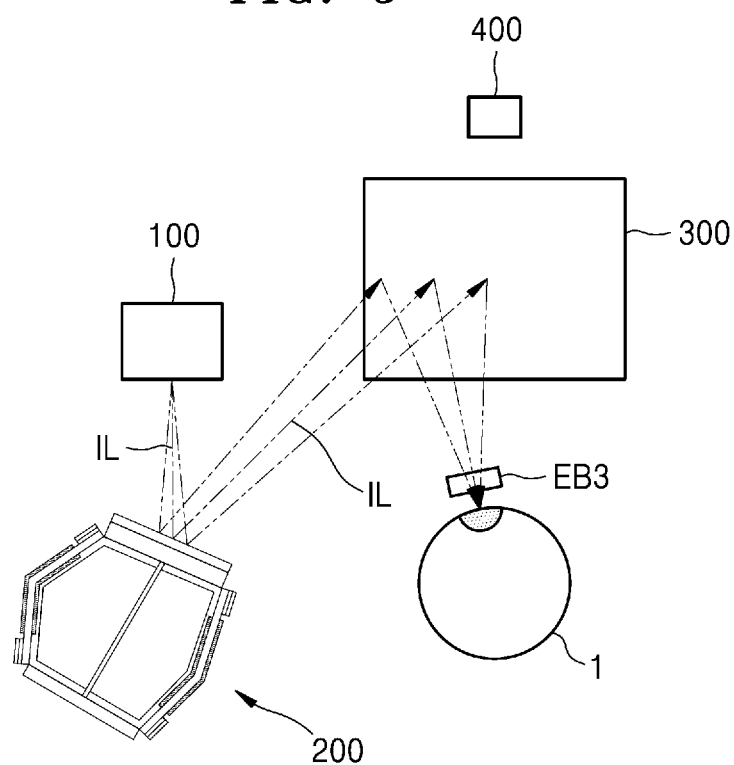
FIG. 9 is a conceptual diagram of a see-through display device for describing a process of adjusting the direction of projection of virtual image light.

FIG. 7 is a conceptual diagram of a see-through display device for describing a process of adjusting the direction of projection of virtual image light. FIG. 8 is a conceptual diagram of a see-through display device for describing a process of adjusting the direction of projection of virtual image light. FIG. 9 is a conceptual diagram of a see-through display device for describing a process of adjusting the direction of projection of virtual image light.

Referring to FIGS. 7 to 9, the image generator 100, the projection optical system 200, the combiner 300, and the eye tracker 400 may be provided. The image generation unit 100, the projection optical system 200, the combiner 300, and the eye tracker 400 may be substantially the same as the image generator 100, the projection optical system 200, the combiner 300, and the eye tracker 400, which are described with reference to FIG. 1, respectively. The projection optical system 200 may be substantially the same as the projection optical system 200 described with reference to FIGS. 2 to 4.

As illustrated in FIG. 7, the pupil of the user 1 may be at a first position. For example, the first position may be the position of the pupil of the user 1 looking at a central portion of the combiner 300. No voltage may be applied to the plurality of actuators 230 of the projection optical system 200. The projection optical system 200 may reflect, to a first region on the combiner 300, the virtual image light IL emitted from the image generator 100. The combiner 300 may concentrate, to the pupil of the user 1 looking at the central portion of the combiner 300, the virtual image light IL incident to the first region from the projection optical system 200. When no voltage is applied to the plurality of actuators 230, an eye box through which the user 1 may view a virtual image may be referred to as a first eye box EB1.

As illustrated in FIG. 8, the pupil of the user 1 may move to a second position. For example, the second position may be the position of the pupil of the user 1 looking at a region (hereinafter, a right region) at the right of the central portion of the combiner 300. A voltage may be applied to one (hereinafter, referred to as a left actuator) of the plurality of actuators 230, and no voltage may be applied to the other actuators 230. The magnitude of the voltage applied to the left actuator 230 may be adjusted as necessary. The projection optical system 200 may reflect, to the right region of the combiner 300, the virtual image light IL emitted from the image generator 100. The combiner 300 may concentrate, to the pupil of the user 1 looking at the right region of the combiner 300, the virtual image light IL incident to the right region from the projection optical system 200. When the voltage is applied to the left actuator 230, an eye box through which the user 1 may view a virtual image may be referred to as a second eye box EB2. The second eye box EB2 may be at the right of the first eye box EB1. When a voltage is applied to the left actuator 230 and no voltage is applied to the other actuators 230, the eye box may move to the right. That is, the eye box may be dynamically expanded.

As illustrated in FIG. 9, the pupil of the user 1 may be at a third position. For example, the third position may be the position of the pupil of the user 1 looking at a region (hereinafter, referred to as a left region) at the left of the central portion of the combiner 300. A voltage may be applied to the other one (hereinafter, the right actuator 230) of the plurality of actuators 230, and no voltage may be applied to the other actuators 230. The magnitude of the voltage applied to the right actuator 230 may be adjusted as necessary. The projection optical system 200 may reflect, to the left region of the combiner 300, the virtual image light IL emitted from the image generator 100. The combiner 300 may concentrate, to the pupil of the user 1 looking at the left region of the combiner 300, the virtual image light IL incident to the left region from the projection optical system 200. When the voltage is applied to the right actuator 230, an eye box through which the user 1 may view a virtual image may be referred to as a third eye box EB3. The third eye box EB3 may be at the left of the first eye box EB1. When a voltage is applied to the right actuator 230 and no voltage is applied to the other actuators 230, the eye box may move to the left. That is, the eye box may be dynamically expanded.

According to the disclosure, an eye box may be dynamically expanded by adjusting the slope of the mirror 222. The slope of the mirror 222 may be adjusted according to a change in the length of the actuators 230 each including the electroactive polymer film 231.

The mirror 222 controlled by the actuators 230 each including the electroactive polymer film 231 may have a higher driving speed than that of a MEMS mirror having the same size. The disclosure may provide the projection optical system 200 having a required driving speed even when the mirror 222 has a sufficiently large size or area, and the see-through display device 10 including the same.

Figure 10:
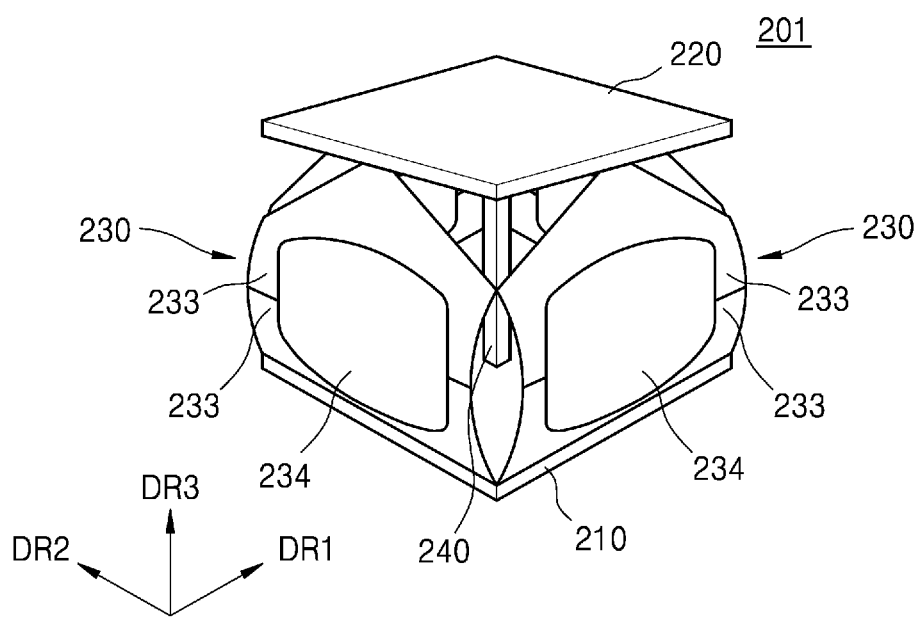
FIG. 10 is a perspective view of a projection optical system, according to an example embodiment.

FIG. 10 is a perspective view of a projection optical system 201, according to an example embodiment. For brevity of description, substantially the same descriptions as provided with reference to FIGS. 2 to 4 may not be provided.

Referring to FIG. 10, the projection optical system 201 may include the base 210, the mirror layer 220, the plurality of actuators 230, the support film 250, and the pivot pillar 240. The base 210, the mirror layer 220, and the pivot pillar 240 may be substantially the same as the base 210, the mirror layer 220, and the pivot pillar 240, which are described with reference to FIGS. 2 to 4, respectively.

Unlike that described with reference to FIGS. 2 to 4, the plurality of actuators 230 may have a width that narrows toward the mirror layer 220, in a region adjacent to the mirror layer 220. The width of the electroactive polymer film 231 of each of the plurality of actuators 230 may decrease toward the mirror layer 220, in the region adjacent to the mirror layer 220. The plurality of actuators 230 may be respectively on four sides of the base 210 having a quadrangular flat plate shape.

The support film 250 in contact with the actuators 230 may be inside the projection optical system 201. The support film 250 may have a shape corresponding to the actuators 230. The support film 250 in contact with the actuators 230 may have a width that narrows toward the mirror layer 220, in a region adjacent to the mirror layer 220.

The disclosure may provide the projection optical system 201 having a required drive speed even when the mirror 222 has a sufficiently large size or area.

Figure 11:
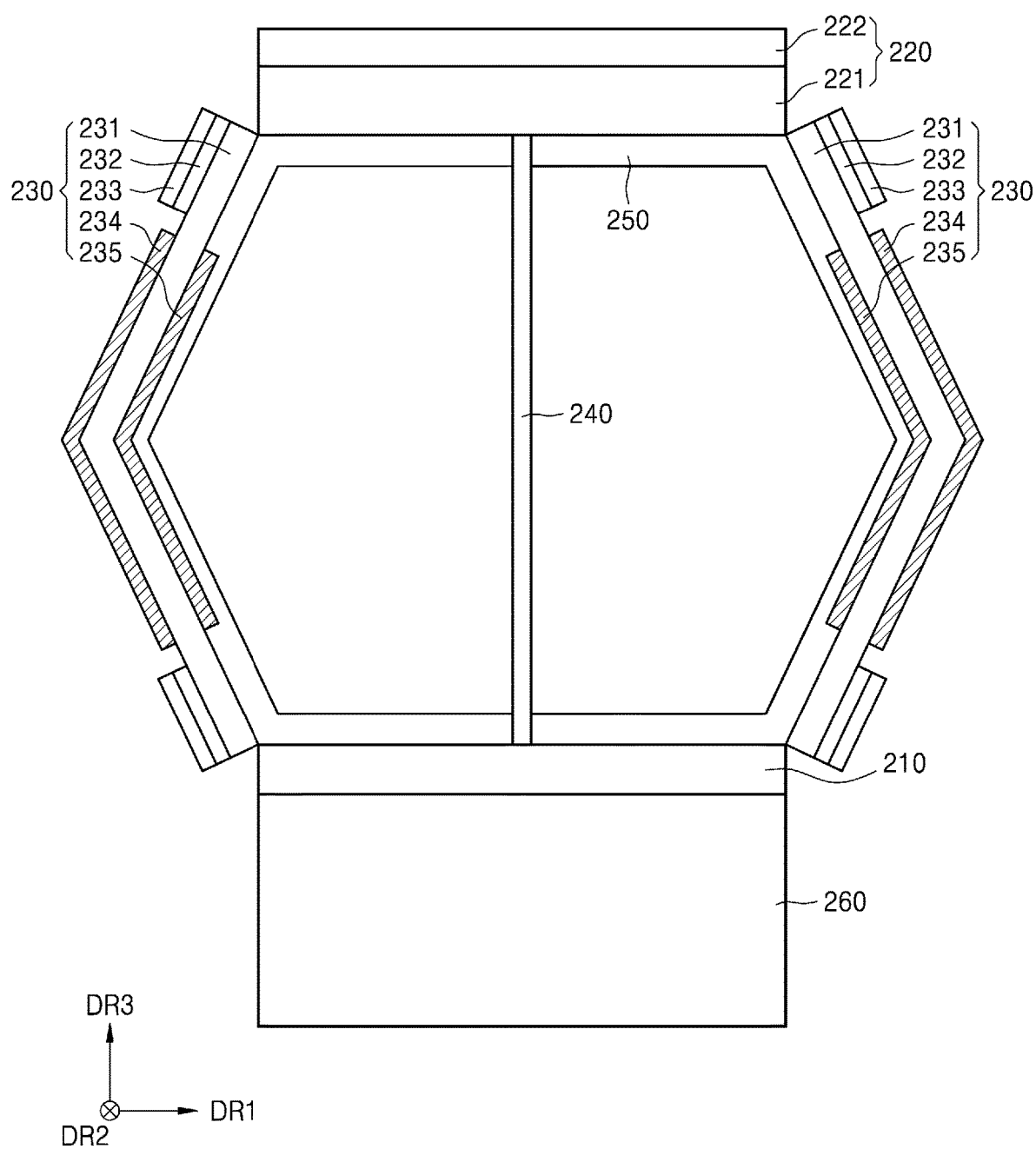
FIG. 11 is a cross-sectional view of a projection optical system, according to an example embodiment.
Figure 12:
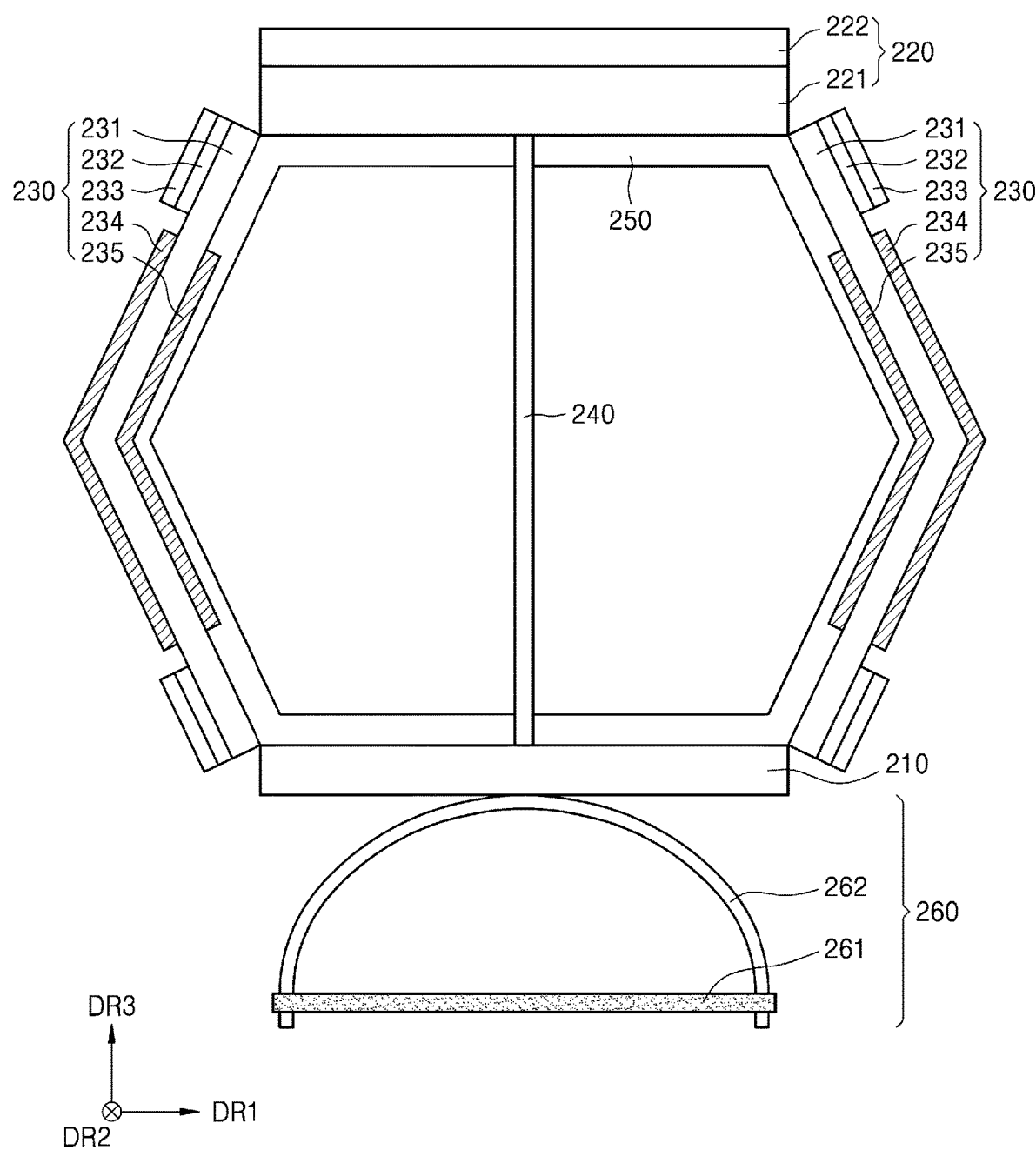
FIG. 12 is a diagram illustrating an example embodiment of the projection optical system of FIG. 11.
Figure 13:
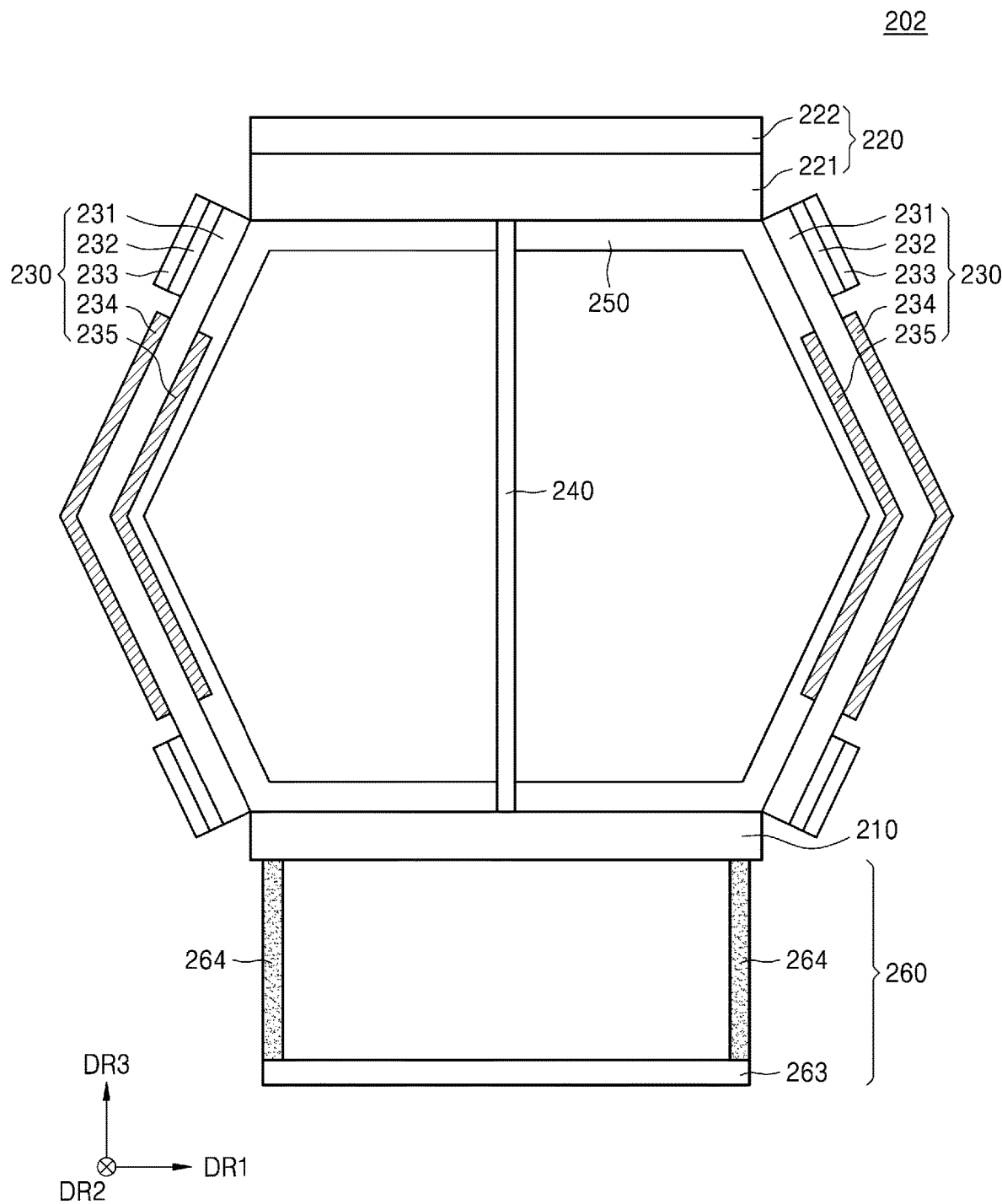
FIG. 13 is a diagram illustrating another example embodiment of the projection optical system of FIG. 11.

FIG. 11 is a cross-sectional view of a projection optical system 202, according to an example embodiment. FIG. 12 is a diagram illustrating an embodiment of the projection optical system 202 of FIG. 11. FIG. 13 is a diagram illustrating another embodiment of the projection optical system 202 of FIG. 11. For brevity of description, substantially the same descriptions as provided with reference to FIGS. 2 to 4 may not be provided.

Referring to FIG. 11, the projection optical system 202 may include the base 210, the mirror layer 220, the plurality of actuators 230, the support film 250, the pivot pillar 240, and a lift element 260. The base 210, the mirror layer 220, the plurality of actuators 230, the support film 250, and the pivot pillar 240 may be substantially the same as the base 210, the mirror layer 220, the plurality of actuators 230, the support film 250, and the pivot pillar 240, which are described with reference to FIGS. 2 to 4, respectively.

The lift element 260 may be at the side opposite to the support film 250 with respect to the base 210. The lift element 260 may be in contact with a surface of the base 210. The lift element 260 may push the base 210 toward the mirror layer 220. By the pivot pillar 240, the distance between the base 210 and the mirror layer 220 may be maintained, and the position of the mirror 222 with respect to the third direction DR3 may be changed. For example, the lift element 260 may include a shape memory alloy (SMA) having a length that varies depending on the temperature.

Referring to FIG. 12, the lift element 260 may include a bridge element 262 and a first deformation element 261. The bridge element 262 may have elasticity and may be long in one direction. Both ends of the bridge element 262 may be wound by the first deformation element 261 having a ring shape. In other words, both ends of the bridge element 262 may be inside the ring shape of the first deformation element 261. The bridge element 262 may have an arch shape bent toward the base 210. In an example, the bridge element 262 may be adhered to the base 210. When not wound by the first deformation element 261, the bridge element 262 may have a straight shape (e.g., an unbent shape). The bridge element 262, when bent, may apply a force to the first deformation element 261 in a direction from the inside toward the outside of the first deformation element 261 (e.g., a direction from the inside toward the outside of the ring shape of the first deformation element 261).

The first deformation element 261 may be a ring having a variable length. The first deformation element 261 may include an SMA. The length of the first deformation element 261 may be increased by the force exerted by the bridge element 262 at a temperature less than a threshold temperature, and may be decreased back at a temperature greater than or equal to the threshold temperature. The temperature of the first deformation element 261 may be adjusted by a voltage applied to the first deformation element 261. As the voltage applied to the first deformation element 261 increases, the temperature of the first deformation element 261 may be increased.

The curvature of the bridge element 262 may be changed according to a change in the length of the first deformation element 261. When the length of the first deformation element 261 is decreased, the curvature of the bridge element 262 may be increased, and the bridge element 262 may push the base 210. When the length of the first deformation element 261 is increased, the curvature of the bridge element 262 may be decreased, and the bridge element 262 may pull the base 210.

Referring to FIG. 13, the lift element 260 may include a lift base 263 and a plurality of second deformation elements 264. The lift base 263 may have a fixed position. For example, the lift base 263 may include substantially the same material as that of the base 210.

A pair of second deformation elements 264 may be between the base 210 and the lift base 263. One end of each of the pair of second deformation elements 264 may be in contact with the base 210 and the other end thereof may be in contact with the lift base 263. In an example, a restoring element may be further provided to apply a force to the base 210 and the lift base 263 to increase the distance between the base 210 and the lift base 263. The pair of second deformation elements 264 may include an SMA. The length of the pair of second deforming elements 264 may be increased by the force exerted by the restoring element to the base 210 and the lift base 263 at a temperature less than a threshold temperature, and may be decreased back at a temperature greater than or equal to the threshold temperature. At a temperature less than the threshold temperature of the pair of second deforming elements 264, the base 210 may be moved away from the lift base 263 by the restoring element. At a temperature greater than or equal to the threshold temperature of the pair of second deforming elements 264, the base 210 may be moved toward the lift base 263 by the restoring element. The temperature of the pair of second deformation elements 264 may be adjusted by a voltage applied to the pair of second deformation elements 264. As the voltage applied to the pair of second deformation elements 264 increases, the temperature of the pair of second deformation elements 264 may be increased.

The lift element 260 of the disclosure may adjust the position of the mirror 222 with respect to the third direction DR3. When the position of the mirror 222 with respect to the third direction DR3 is changed, the position of a virtual image formed by virtual image light may be changed. When the distance along an optical path between the mirror 222 and the combiner 300 is decreased, the distance between the virtual image and the combiner 300 may also be decreased. When the distance along the optical path between the mirror 222 and the combiner 300 is increased, the distance between the virtual image and the combiner 300 may also be increased.

Figure 14:
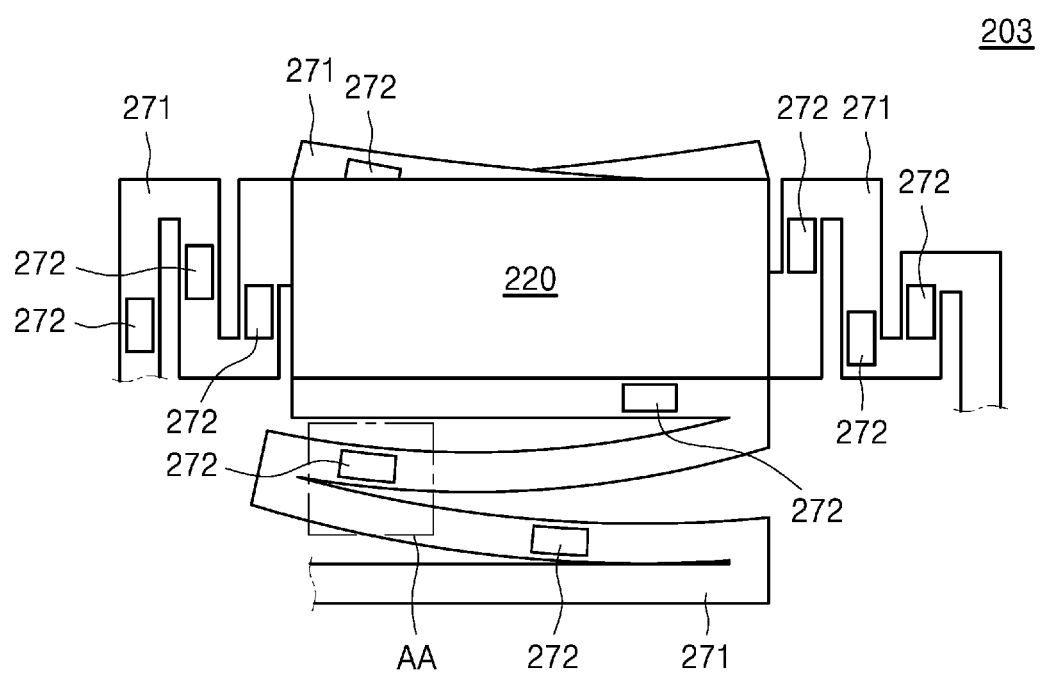
FIG. 14 illustrates a projection optical system, according to an example embodiment.
Figure 15:
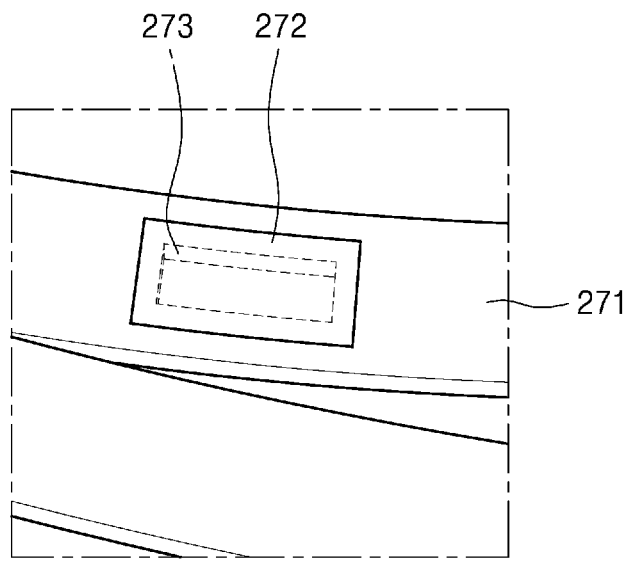
FIG. 15 is an enlarged view of region AA of FIG. 14 for describing driving of the projection optical system of FIG. 14.
Figure 16:
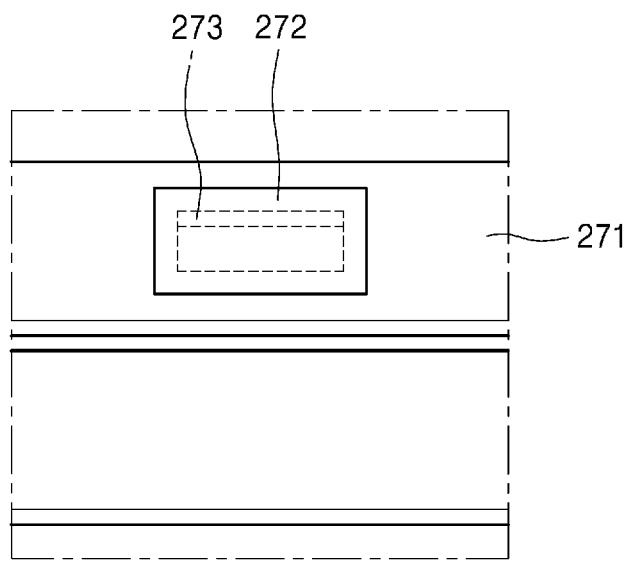
FIG. 16 is an enlarged view corresponding to region AA of FIG. 14 for describing driving of the projection optical system of FIG. 14.

FIG. 14 illustrates a projection optical system 203, according to an example embodiment. FIG. 15 is an enlarged view of region AA of FIG. 14 for describing driving of the projection optical system 203 of FIG. 14. FIG. 16 is an enlarged view corresponding to region AA of FIG. 14 for describing driving of the projection optical system 203 of FIG. 14. For brevity of description, substantially the same descriptions as provided with reference to FIGS. 2 to 4 may not be provided.

Referring to FIGS. 14 to 16, the projection optical system 203 may include the mirror layer 220, a plurality of serpentine springs 271, and a plurality of electroactive polymer films 272. The mirror layer 220 may be substantially the same as the mirror layer 220 described with reference to FIGS. 2 to 4.

The plurality of serpentine springs 271 may be at four sides of the mirror layer 220, respectively. The plurality of serpentine springs 271 may be substantially the same as each other. For brevity of description, one serpentine spring 271 is described. The serpentine spring 271 may include a plurality of flat plates. The plurality of flat plates may extend in one direction. The plurality of flat plates may be connected to each other to constitute a zigzag shape. The plurality of flat plates may have a plurality of holes 273, respectively. Each of the plurality of holes 273 may penetrate the plurality of flat plates. When no force is applied to the serpentine spring 271, the plurality of flat plates may be arranged parallel to each other on a plane. For example, one end and the other end of the serpentine spring 271 may be at the same height. When a force is applied to bend the plurality of flat plates in the same direction, the one end and the other end of the serpentine spring 271 may be at different heights. When one end of the serpentine spring 271 is coupled to a base and the other end thereof is coupled to an object, the plurality of flat plates may be bent to lift the object from the base.

The plurality of electroactive polymer films 272 may be on the plurality of flat plates, respectively. A pair of electrodes may be respectively on both surfaces of each of the electroactive polymer films 272. The electroactive polymer film 272 may be pre-stretched and adhered to each flat plate.

The plurality of serpentine springs 271, the plurality of electroactive polymer films 272, and the electrodes may constitute an actuator.

When no voltage is applied to the pair of electrodes, the size or area of the electroactive polymer film 272 may be decreased. The electroactive polymer film 272 may pull the flat plate. As illustrated in FIG. 15, the flat plate may be bent.

When a voltage is applied to the pair of electrodes, the size or area of the electroactive polymer film 272 may be increased. The force with which the electroactive polymer film pulls the flat plate may be decreased. When the magnitude of the voltage applied to the pair of electrodes is sufficiently high, the electroactive polymer film 272 may not pull the flat plate. In this case, as illustrated in FIG. 16, the electroactive polymer film 272 may be in a straight state (e.g., an unbent state).

The disclosure may provide the projection optical system 203 including the serpentine spring driven by using the electroactive polymer film 272.

Figure 17:
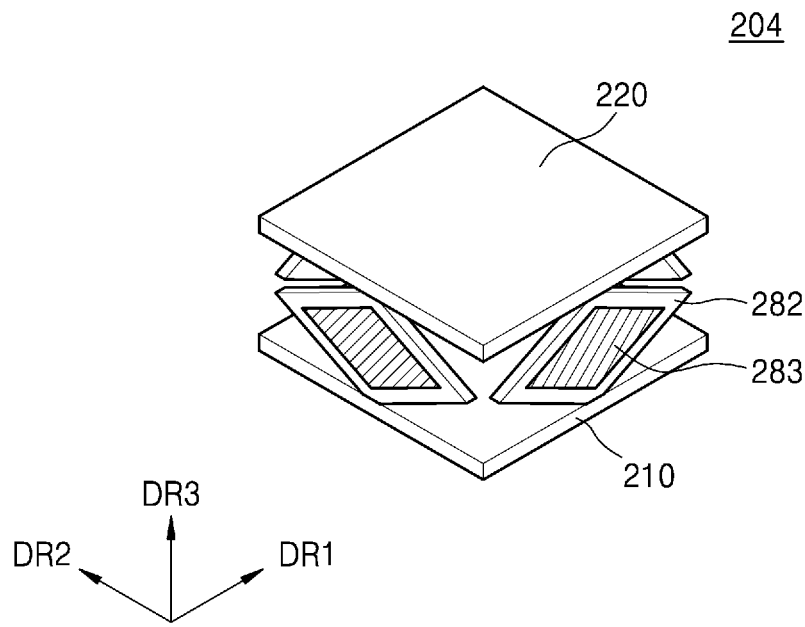
FIG. 17 is a perspective view of a projection optical system, according to an example embodiment.
Figure 18:
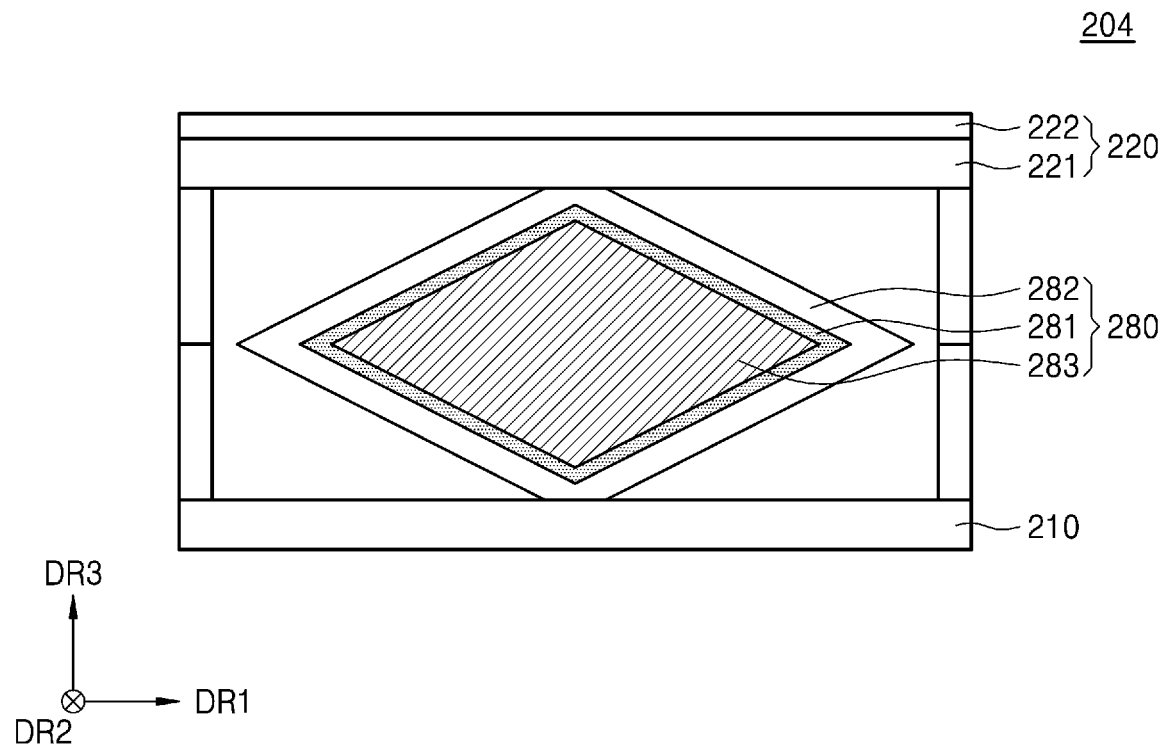
FIG. 18 is a side view of the projection optical system of FIG. 17.
Figure 19:
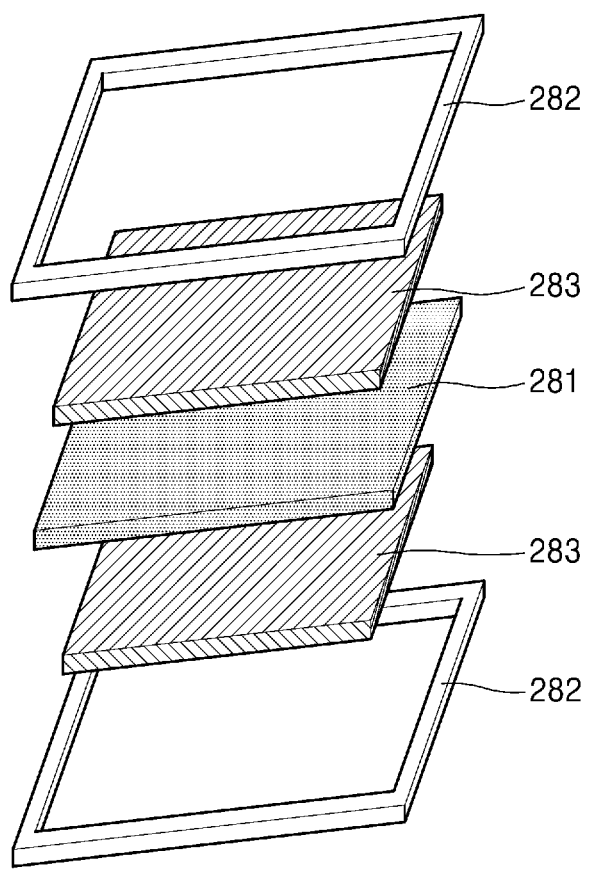
FIG. 19 is an exploded perspective view of an actuator of the projection optical system of FIG. 17.

FIG. 17 is a perspective view of a projection optical system 204, according to an example embodiment. FIG. 18 is a side view of the projection optical system 204 of FIG. 17. FIG. 19 is an exploded perspective view of an actuator 230 of the projection optical system 204 of FIG. 17. For brevity of description, substantially the same descriptions as provided with reference to FIGS. 2 to 4 may not be provided.

Referring to FIGS. 17 to 19, the projection optical system 204 may be provided. The projection optical system 204 may include the base 210, the mirror layer 220, and a plurality of actuators 280. The base 210 and the mirror layer 220 may be substantially the same as the base 210 and the mirror layer 220, which are described with reference to FIGS. 2 to 4, respectively.

The plurality of actuators 280 may be substantially the same as each other. For brevity of description, one actuator 280 will be described. The actuator 280 may include an electroactive polymer film 281, a pair of frames 282, and a pair of electrodes 283. The electroactive polymer film 281 may be substantially the same as the electroactive polymer film 231 described with reference to FIGS. 2 to 4, except for its shape. The electroactive polymer film 281 may have a rhombic shape. One corner of the electroactive polymer film 281 may be adjacent to the base 210, and another corner opposite to the one corner may be adjacent to the mirror layer 220. The electroactive polymer film 281 may be pre-stretched.

The pair of frames 282 may be on both surfaces of the electroactive polymer film 281, respectively. The pair of frames 282 may have a rhombic ring shape. The pair of frames 282 may extend along the edge of the electroactive polymer film 281. Both surfaces of the electroactive polymer film 281 may be exposed inside the pair of frames 282. The pair of frames 282 may be adhered to the surfaces of the pre-stretched electroactive polymer film 281 to maintain the stretched state of the electroactive polymer film 281. The pair of frames 282 may be rigid. However, the pair of frames 282 may be deformed. The deformation of the pair of frames 282 will be described below.

The pair of electrodes 283 may be on both surfaces of the electroactive polymer film 281, respectively. The pair of electrodes 283 may be surrounded by the pair of frames 282. The pair of electrodes 283 may be spaced apart from the pair of frames 282. The pair of electrodes 283 may be respectively on both surfaces of the electroactive polymer film 281 exposed by the pair of frames 282. The pair of electrodes 283 may include substantially the same material as those of the first electrode 234 and the second electrode 235, which are described with reference to FIGS. 2 to 4.

Figure 20:
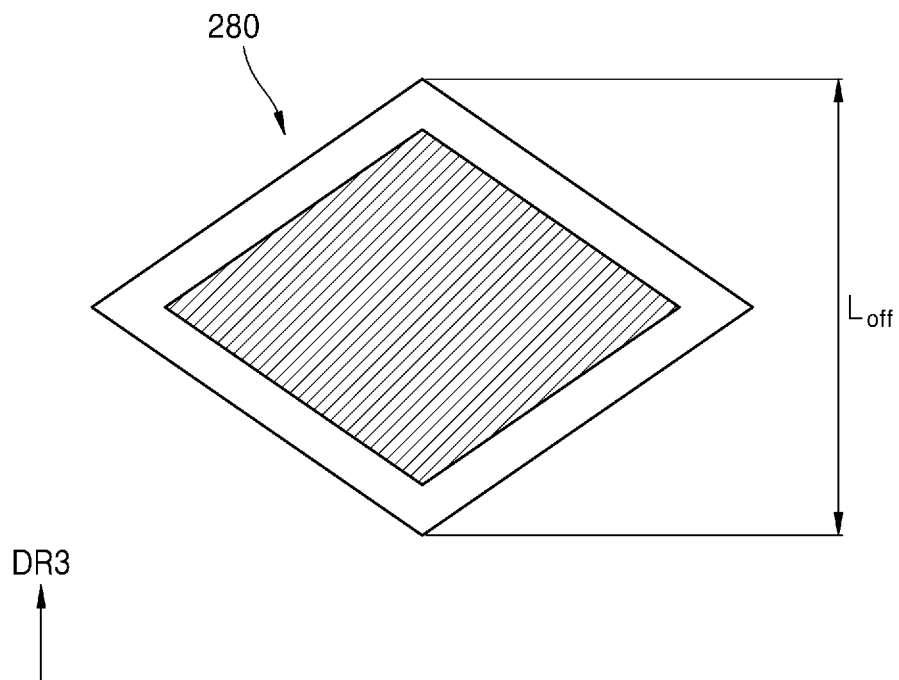
FIG. 20 and FIG. 21 are diagrams for describing an operation of the actuator of FIG. 17.
Figure 21:
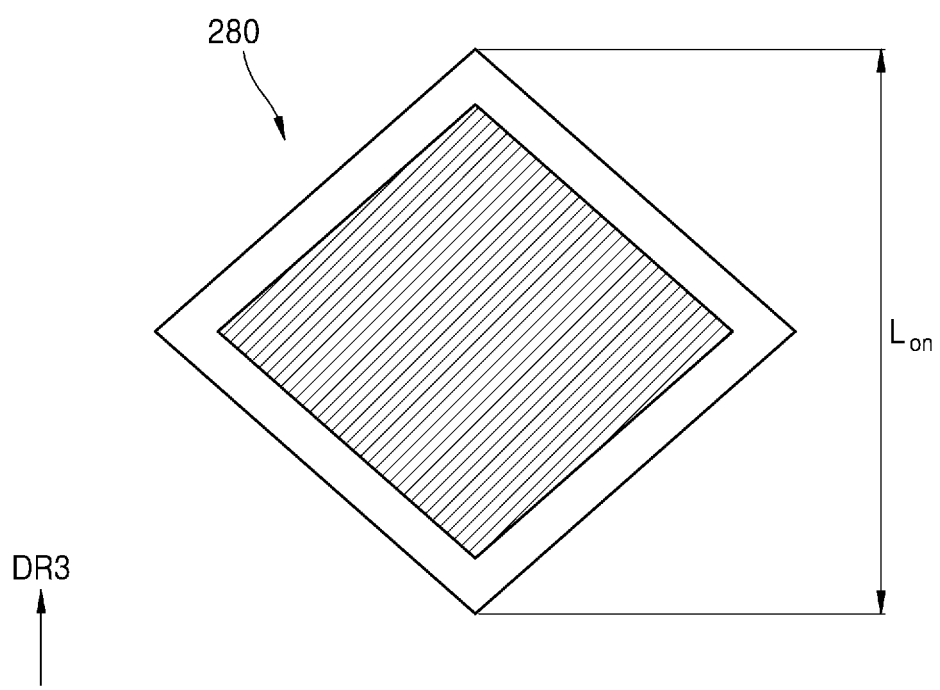

FIG. 20 and FIG. 21 are diagrams for describing an operation of the actuator 280 of FIG. 17.

Referring to FIG. 20, no voltage may be applied to the actuator 280. The electroactive polymer film 281 is in a pre-stretched state, and thus may have a property of being restored to its original shape. Accordingly, the electroactive polymer film 281 may pull the pair of frames 282. The actuator 280 may have a first vertical length $L_{off}$ in the third direction DR3.

Referring to FIG. 21, a voltage may be applied to the actuator 280. Because the size or area of the electroactive polymer film 281 is increased, the force exerted by the electroactive polymer film 281 to pull the pair of frames 282 may be decreased or removed. The actuator 280 may have a second vertical length $L_{on}$ in the third direction DR3. The second vertical length $L_{on}$ may be greater than the first vertical length $L_{off}$.

The disclosure may provide the projection optical system 204 capable of controlling the slope of the mirror 222 by independently adjusting vertical distances of the plurality of actuators 280.

Figure 22:
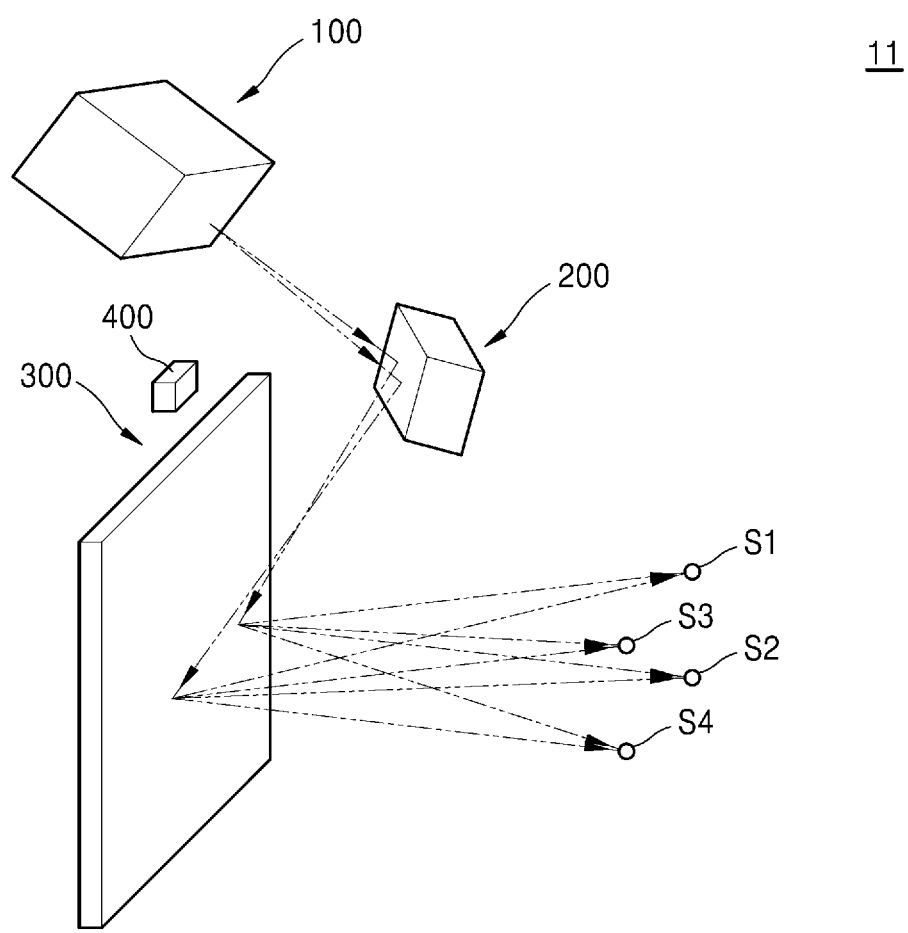
FIG. 22 is a conceptual diagram of a see-through display device, according to an example embodiment.

FIG. 22 is a conceptual diagram of a see-through display device 11, according to an example embodiment. For brevity of description, substantially the same descriptions as provided with reference to FIG. 1 may not be provided.

Referring to FIG. 22, the see-through display device 11 may be provided. The see-through display device 11 may include the image generator 100, the projection optical system 200, the combiner 300, and the eye tracker 400. The image generator 100, the projection optical system 200, and the eye tracker 400 may be substantially the same as those described with reference to FIG. 1. The projection optical system 200 may be one of the projection optical systems 201, 202, 203, and 204 described above, instead of the projection optical system 200 described with reference to FIGS. 2 to 4.

Unlike that described with reference to FIG. 1, the combiner 300 may concentrate, to a plurality of spots S1, S2, S3, and S4, the virtual image light IL projected from the projection optical system 200. Accordingly, the eye box may be expanded statically as well as dynamically.

Figure 23:
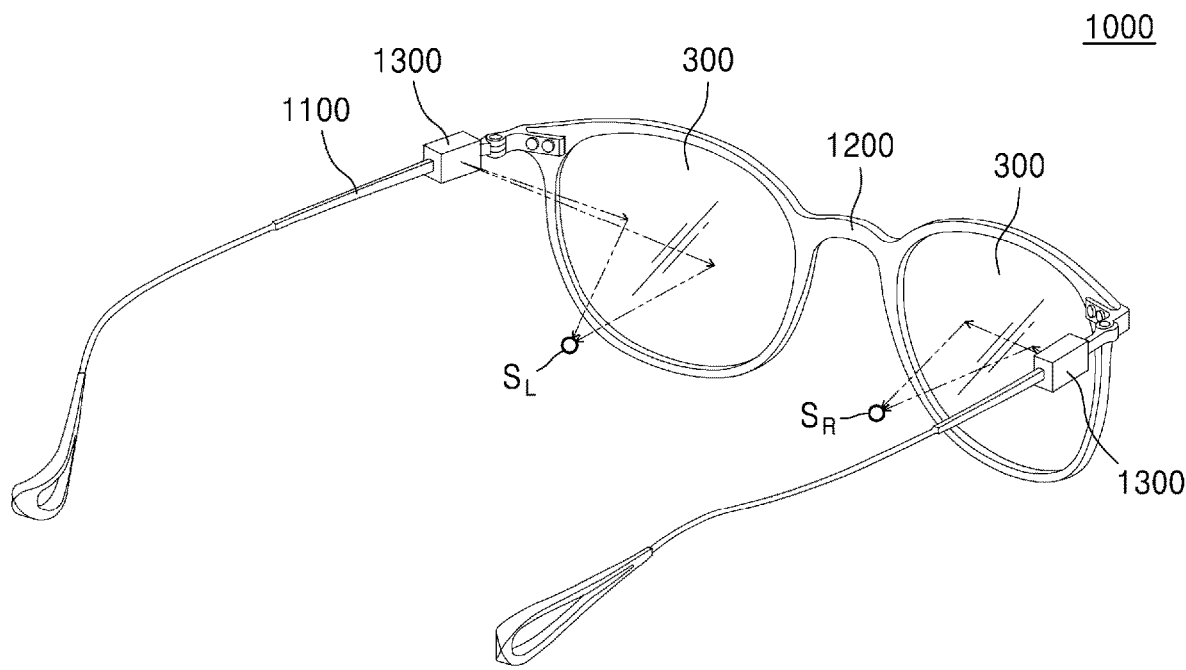
FIG. 23 is a perspective view of a see-through display device, according to an example embodiment.

FIG. 23 is a perspective view of a see-through display device 1000 according to an example embodiment. For brevity of description, substantially the same descriptions as provided with reference to FIG. 1 may not be provided.

Referring to FIG. 23, the see-through display device 1000 may be provided. For example, the see-through display device 1000 may be a glasses-type augmented reality device. The see-through display device 1000 may include a pair of temples 1100, a lens frame 1200, an electronic system 1300, and a pair of combiners 300. The pair of templates 1100 may be connected to both ends of the lens frame 1200, respectively. The pair of temples 1100 may be put on the ears of a user.

The lens frame 1200 may include a pair of holes. The pair of combiners 300 may be inserted into the pair of holes, respectively. When the user wears the see-through display device 1000, both eyes of the user may face the pair of combiners 300, respectively.

The electronic system 1300 may include the image generator, the projection optical system, and the eye tracker, which are described with reference to FIG. 1. Virtual image light may be emitted from the electronic system 1300 to the combiner 300. The virtual image light may be reflected and concentrated by the combiner 300. For example, the virtual image light concentrated by the combiner 300 facing the left eye of the user may be concentrated to a left spot SL, and the virtual image light concentrated by the combiner 300 facing the right eye of the user may be concentrated to a right spot SR. Real image light may pass through the pair of combiners 300 to reach both eyes of the user. Accordingly, the user may view the virtual image and the real image at the same time. In another example, as described with reference to FIG. 22, the combiner 300 may concentrate, to a plurality of spots, the virtual image light provided from the electronic system 1300.

Figure 24:
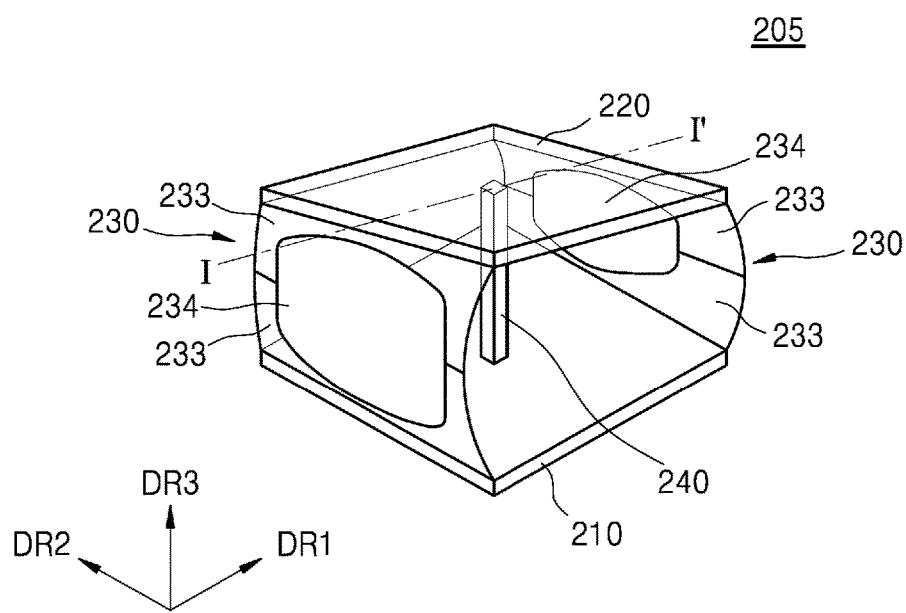
FIG. 24 is a perspective view of a projection optical system, according to an example embodiment.

FIG. 24 is a perspective view of a projection optical system 205, according to an example embodiment. For brevity of description, substantially the same descriptions as provided with reference to FIGS. 2 to 4 may not be provided.

Referring to FIG. 24, the projection optical system 205 may be provided with the base 210, the mirror layer 220, the plurality of actuators 230, the support film 250, and the pivot pillar 240. The base 210, the mirror layer 220, and the pivot pillar 240 may be substantially the same as the base 210, the mirror layer 220, and the pivot pillar 240, which are described with reference to FIGS. 2 to 4, respectively.

Unlike as illustrated in FIG. 2, the plurality of actuators 230 may be a pair of actuators 230 facing each other in the first direction DR1. Each of the plurality of actuators 230 may be substantially the same as each of the plurality of actuators 230 described with reference to FIGS. 2 to 4. Because the projection optical system 205 includes two actuators 230, the projection optical system 205 may have one degree of freedom with respect to inclination of the mirror layer 220. For example, the mirror layer 220 may be inclined on a virtual plane parallel to the first direction DR1 and the third direction DR3.

The disclosure may provide the projection optical system 205 having a required drive speed even when the mirror 222 has a sufficiently large size or area.

The disclosure may provide a projection optical system having a large area and a high driving speed.

The disclosure may provide a see-through display device including a projection optical system having a large area and a high driving speed.

However, the effects of the disclosure are not limited to those described above.

According to an example embodiment, the methods and/or operations illustrated in FIGS. 1, 5-9, 15, 16, 20, 21 and 22 may be performed by an electronic device including a memory and a processor. For instance, according to an example embodiment, a display device may include a memory, a processor and a projection optical system according to any of the embodiments of the disclosure. According to an example embodiment, the processor (in combination with a memory) may control the projection optical system. According to another example embodiment, the display device may include a controller configured to control the projection optical system.

At least one of the components, elements, modules or units (collectively "components" in this paragraph) represented by a block in the drawings, such as the image generator, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. According to an example embodiment, the algorithms or computer programs may be stored in a memory or a storage device. Furthermore, the components represented by a block or processing steps may employ any number of related art techniques for electronics configuration, signal processing and/or control, data processing and the like.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A projection optical system comprising:
a base;
a mirror; and
a pair of first actuators provided between the base and the mirror, the pair of first actuators configured to face each other in a first direction,
wherein each of the pair of first actuators comprises a first electroactive polymer film having structural flexibility such that a size of the first electroactive polymer film is changeable based on an applied voltage,
wherein the mirror is adjustable based on a change in the size of the first electroactive polymer film,
wherein the first electroactive polymer film has a first surface and a second surface, and
wherein each of the pair of first actuators further comprises:
a first electrode provided on the first surface;
a second electrode provided on the second surface;
a first stretch maintaining film provided to surround the first electrode; and
a pair of first hinge elements provided on the first stretch maintaining film.

2. The projection optical system of claim 1, wherein the first stretch maintaining film comprises a hole, and
the first electrode is provided in the hole.

3. The projection optical system of claim 1, wherein the pair of first hinge elements are spaced apart from each other, and
wherein the first electrode is provided between the pair of first hinge elements in a second direction from the base toward the mirror.

4. The projection optical system of claim 1, wherein the second surfaces of the pair of first actuators face each other.

5. The projection optical system of claim 1, wherein, in a region adjacent to the mirror, the first electroactive polymer film has a first width that decreases toward the mirror.

6. The projection optical system of claim 1, further comprising a pair of second actuators which are between the pair of first actuators and face each other in a third direction intersecting with the first direction,
wherein each of the pair of second actuators comprises:
a second electroactive polymer film having a third surface and a fourth surface;
a third electrode provided on the third surface;
a fourth electrode provided on the fourth surface;
a second stretch maintaining film provided to surround the third electrode; and
a pair of second hinge elements provided on the second stretch maintaining film.

7. A projection optical system comprising:
a base;
a mirror; and
a pair of first actuators provided between the base and the mirror, the pair of first actuators configured to face each other in a first direction,
wherein each of the pair of first actuators comprises a first electroactive polymer film having structural flexibility such that a size of the first electroactive polymer film is changeable based on an applied voltage,
wherein the mirror is adjustable based on a change in the size of the first electroactive polymer film,
wherein each of the pair of first actuators further comprises a serpentine spring comprising a plurality of plates connected to each other to form a zigzag shape,
wherein the plurality of plates has a plurality of holes penetrating the plurality of plates, and
wherein the first electroactive polymer film comprises a plurality of first electroactive polymer films provided on the plurality of plates to cover the plurality of holes to deform the serpentine spring.

8. The projection optical system of claim 1, wherein each of the pair of first actuators further comprises a lift element provided at a side opposite to the mirror with respect to the base, and
wherein the lift element is configured to push or pull the base.

9. The projection optical system of claim 8, wherein the lift element comprises:
a lift base facing the base;
a restoring element configured to apply a force to the base and the lift base to increase a distance between the base and the lift base; and
a deformation element provided between the lift base and the base,
wherein a length of the deformation element varies according to a temperature of the deformation element, and
a distance between the base and the lift base is adjusted by the restoring element and the deformation element.

10. The projection optical system of claim 1, further comprising a support film between the base, the mirror, and the pair of first actuators,
wherein the support film extends along surfaces of the base, the mirror, and the pair of first actuators.

11. The projection optical system of claim 1, further comprising a pivot pillar between the base and the mirror,
wherein one end of the pivot pillar is in contact with the base, and
another end of the pivot pillar is in contact with the mirror.

12. A see-through display device comprising:
an image generator configured to generate virtual image light comprising virtual image information;
a combiner configured to concentrate the virtual image light to a first spot; and
a projection optical system configured to project, to the combiner, the virtual image light provided from the image generator,
wherein the projection optical system comprises:
a base,
a mirror, and
a pair of actuators provided between the base and the mirror, the pair of actuators configured to face each other in a first direction,
wherein each of the pair of actuators comprises an electroactive polymer film having structural flexibility such that a size of the electroactive polymer film is changeable based on an applied voltage,
wherein the mirror is adjustable based on a change in the size of the electroactive polymer film, and
wherein the electroactive polymer film has a first surface and a second surface, and
each of the pair of actuators further comprises:
a first electrode provided on the first surface,
a second electrode provided on the second surface,
a stretch maintaining film provided to surround the first electrode, and
a pair of hinge elements provided on the stretch maintaining film.

13. A projection optical system comprising:
a base portion;
a mirror; and
at least one actuator provided between the base portion at the mirror, the at least one actuator comprising an electroactive polymer film having a malleable structure, which is changeable based on an applied voltage,
wherein the mirror is adjustable based on a change in a structure of the electroactive polymer film, and
wherein the electroactive polymer film has a first surface and a second surface, and
the at least one actuator further comprises:
a first electrode provided on the first surface,
a second electrode provided on the second surface,
a stretch maintaining film provided to surround the first electrode, and
a pair of hinge elements provided on the stretch maintaining film.

14. The projection optical system of claim 13, wherein a position or a direction of the mirror is adjustable based on a change in the structure of electroactive polymer film.

* * * * *